US012812098B2

(12) United States Patent
Heo et al.

(10) Patent No.: US 12,812,098 B2
(45) **Date of Patent: *Nov. 24, 2026**

(54) INTRA PREDICTION-BASED IMAGE CODING METHOD AND DEVICE USING MPM LIST

(71) Applicant: Nokia Technologies Oy, Espoo (FI)

(72) Inventors: Jin Heo, Seoul (KR); Sunmi Yoo, Seoul (KR); Ling Li, Seoul (KR); Jangwon Choi, Seoul (KR); Jungah Choi, Seoul (KR)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 18/980,322

(22) Filed: Dec. 13, 2024

(65) Prior Publication Data

US 2025/0113024 A1 Apr. 3, 2025

Related U.S. Application Data

(63) Continuation of application No. 18/377,577, filed on Oct. 6, 2023, now Pat. No. 12,200,205, which is a
(Continued)

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/132* (2014.11); *H04N 19/176* (2014.11); *H04N 19/593* (2014.11)

(58) Field of Classification Search
CPC ..... H04N 19/11; H04N 19/105; H04N 19/132
See application file for complete search history.

(56) References Cited

U.S. PATENT DOCUMENTS 9,350,993 B2 * 5/2016 Lee ........................ H04N 19/70
9,955,169 B2 * 4/2018 Lee ...................... H04N 19/176
(Continued)

FOREIGN PATENT DOCUMENTS

JP 2018-026870 A 2/2018
KR 10-2013-0045150 A 5/2013
(Continued)

OTHER PUBLICATIONS

A simple 6 MPM list with truncated binary coding for non MPM signaling; 2018. (Year: 2018).*
(Continued)

*Primary Examiner* — Luis Perez-Fuentes
(74) *Attorney, Agent, or Firm* — ALSTON & BIRD LLP

(57) ABSTRACT

An image decoding method according to the present document derives a left mode, which is a candidate intra prediction mode for a left peripheral block of a current block, derives an upper mode, which is a candidate intra prediction mode for an upper peripheral block of the current block, constructs an MPM list on the basis of the left mode and the upper mode, derives an intra prediction mode of the current block on the basis of the MPM list, generates prediction samples of the current block on the basis of the intra prediction mode, generates a restoration picture of the current block on the basis of the prediction samples, and derives the left mode or the upper mode as one from among candidate intra prediction modes of the MPM list, on the basis of when the left mode and the upper mode are not the same and the left mode and the upper mode are respectively a planar mode and a DC mode.

18 Claims, 14 Drawing Sheets

Related U.S. Application Data continuation of application No. 17/733,933, filed on Apr. 29, 2022, now Pat. No. 11,838,501, which is a continuation of application No. 17/369,706, filed on Jul. 7, 2021, now Pat. No. 11,368,683, which is a continuation of application No. PCT/KR2020/000264, filed on Jan. 7, 2020.

(60) Provisional application No. 62/790,456, filed on Jan. 9, 2019.

(51) Int. Cl.
*H04N 19/132* (2014.01)
*H04N 19/176* (2014.01)
*H04N 19/593* (2014.01)

(56) References Cited

U.S. PATENT DOCUMENTS

| | | | | |
|---|---|---|---|---|
| 10,531,084 | B2 * | 1/2020 | Yoo | H04N 19/107 |
| 10,771,778 | B2 * | 9/2020 | Zhao | H04N 19/103 |
| 10,931,943 | B2 * | 2/2021 | Li | H04N 19/11 |
| 10,965,940 | B2 * | 3/2021 | Li | H04N 19/159 |
| 11,368,683 | B2 * | 6/2022 | Heo | H04N 19/176 |
| 11,375,206 | B2 | 6/2022 | Park et al. | |
| 11,394,965 | B2 * | 7/2022 | Li | H04N 19/11 |
| 11,516,506 | B2 | 11/2022 | Ling et al. | |
| 11,889,063 | B2 * | 1/2024 | Heo | H04N 19/70 |
| 12,200,205 | B2 * | 1/2025 | Heo | H04N 19/176 |
| 2018/0332284 | A1 | 11/2018 | Liu et al. | |
| 2019/0052903 | A1 | 2/2019 | Maani et al. | |
| 2020/0314420 | A1 | 10/2020 | Park | |
| 2022/0295078 | A1 | 9/2022 | Park et al. | |

FOREIGN PATENT DOCUMENTS

| | | | |
|---|---|---|---|
| KR | 10-2013-0079128 | A | 7/2013 |
| KR | 10-2014-0098054 | A | 8/2014 |

OTHER PUBLICATIONS

Multiple Direct Modes for chroma intra coding; Zhang—2017. (Year: 2017).*
Neighbor based intra most probable modes list derivation; Seregin—2016. (Year: 2016).*
The Most Probable Mode Signaling for Luma; Guo—2011. (Year: 2011).*
Versatile Video Coding Draft 2—Brass—2018 (Year: 2018).
IPEA/409—International Preliminary Report on Patentability Mailed on Jul. 22, 2021 for WO Application No. PCT/KR20/000264, 12 page(s).
Non-Final Rejection Mailed on Apr. 6, 2023 for U.S. Appl. No. 17/733,933, 7 page(s).
Non-Final Rejection Mailed on Jun. 28, 2024 for U.S. Appl. No. 18/377,577, 8 page(s).
Non-Final Rejection Mailed on Oct. 27, 2021 for U.S. Appl. No. 17/369,706, 9 page(s).
Notice of Allowance and Fees Due (PTOL-85) Mailed on Feb. 2, 2022 for U.S. Appl. No. 17/369,706, 8 page(s).
Notice of Allowance and Fees Due (PTOL-85) Mailed on Jul. 10, 2023 for U.S. Appl. No. 17/733,933, 8 page(s).
Notice of Allowance and Fees Due (PTOL-85) Mailed on Sep. 6, 2024 for U.S. Appl. No. 18/377,577, 8 page(s).
Office Action for Korean Application No. 10-2021-7021343 dated Mar. 27, 2024, 15 pages.
Outgoing—ISA/210—International Search Report Mailed on Apr. 20, 2020 for WO Application No. PCT/KR20/000264, 5 page(s).
Outgoing Written Opinion of the ISA Mailed on Apr. 20, 2020 for WO Application No. PCT/KR20/000264, 9 page(s).
Written Decision on Registration for Korean Application No. 10-2021-7021343 dated Nov. 12, 2024, 10 pages.
Office Action for Korean Application No. 10-2025-7004646 dated Jun. 4, 2026, 8 pages.
Bross et al., "Versatile Video Coding (Draft 3)", Joint Video Experts Team (JVET) of ITU-T 3G 16 WP 3 and ISO/IEC JTC 1/SC 29/WG 11, JVET-L1001-v9, 12th Meeting: Macao, CN, Oct. 3-12, 2018, pp. 1-235.

* cited by examiner

INTRA PREDICTION-BASED IMAGE CODING METHOD AND DEVICE USING MPM LIST

CROSS-REFERENCE TO RELATED APPLICATIONS

This application is a continuation of U.S. patent application Ser. No. 18/377,577 filed Oct. 6, 2023, now allowed, which is a continuation of U.S. application Ser. No. 17/733,933 filed Apr. 29, 2022 now U.S. Pat. No. 11,838,501 issued Dec. 5, 2024, which is a Continuation of U.S. patent application Ser. No. 17/369,706 filed Jul. 7, 2021, now U.S. Pat. No. 11,368,683 issued Jun. 21, 2022, which is a bypass continuation of PCT International Application No. PCT/KR2020/000264, filed on Jan. 7, 2020, which claims priority under 35 U.S.C. 119(e) to 62/790,456 filed on Jan. 9, 2019, which is hereby incorporated by reference herein in their entirety.

BACKGROUND OF DISCLOSURE

Field of the Disclosure

This document relates to image coding technology and, more particularly, to an image coding method using intra prediction based on a Most Probable Mode (MPM) list, and an apparatus therefor.

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY

This document is to provide a method and apparatus for improving image coding efficiency.

This document is also to provide an efficient inter prediction method and apparatus.

This document is still also to provide an image coding method and apparatus for deriving an MPM list.

This document is still also to provide a method and apparatus for constructing an MPM list in multiple reference line-based intra prediction.

According to an embodiment of this document, an image decoding method performed by a decoding apparatus is provided. The method includes deriving a left mode which is a candidate intra prediction mode for a left neighbouring block of a current block, deriving an upper mode which is a candidate intra prediction mode for an upper neighbouring block of the current block, constructing a Most Probable Mode (MPM) list based on the left mode and the upper mode, deriving an intra prediction mode for the current block based on the MPM list, generating prediction samples for the current block based on the intra prediction mode, and generating a reconstructed picture for the current block based on the prediction samples, wherein the constructing the MPM list includes deriving the left mode or the upper mode as one of candidate intra prediction modes in the MPM list, based on a case where the left mode and the upper mode are not the same and the left mode and the upper mode are a planar mode and a DC mode, respectively.

According to another embodiment of the disclosure, an image encoding method performed by an encoding apparatus is provided. The method includes deriving a left mode which is a candidate intra prediction mode for a left neighbouring block of a current block, deriving an upper mode which is a candidate intra prediction mode for an upper neighbouring block of the current block, constructing a Most Probable Mode (MPM) list based on the left mode and the upper mode, deriving an intra prediction mode of the current block based on the MPM list, generating intra prediction mode information related to indicating an intra prediction mode of the current block, and encoding image information including the intra prediction mode information, wherein the constructing the MPM list includes deriving the left mode or the upper mode as one of candidate intra prediction modes in the MPM list, based on a case where the left mode and the upper mode are not the same and the left mode and the upper mode are a planar mode and a DC mode, respectively.

According to an embodiment of this document, there is provided a computer-readable digital storage medium storing encoded image information which causes performing the image decoding method.

According to this document, it is possible to improve overall image/video compression efficiency.

According to this document, it is possible to improve overall coding efficiency by reducing computational complexity and improving prediction performance.

According to this document, in performing multiple reference line-based intra prediction, by efficiently deriving candidate intra prediction modes in the MPM list, a small number of bits can be allocated for coding, thereby improving overall coding efficiency.

DESCRIPTION OF EMBODIMENTS

Figure 1:
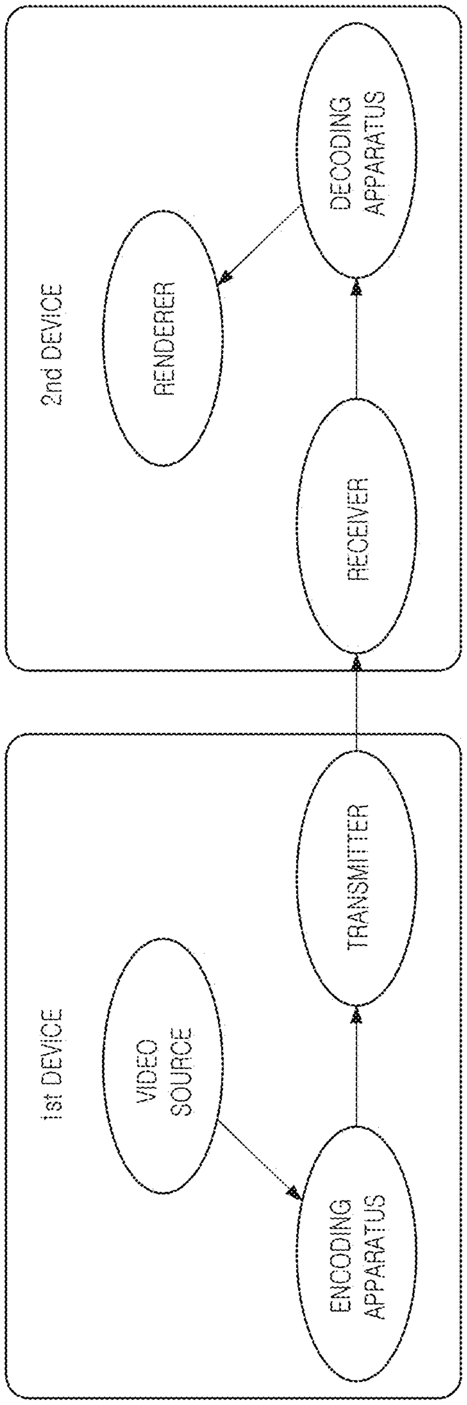
FIG. 1 schematically illustrates an example of a video/image coding system to which embodiments of this document may be applied.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

Hereinafter, preferred embodiments of this document are described more specifically with reference to the accompanying drawings. Hereinafter, in the drawings, the same reference numeral is used in the same element, and a redundant description of the same element may be omitted.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

FIG. 1 schematically illustrates an example of a video/image coding system to which embodiments of this document may be applied.

Referring to FIG. 1, a video/image coding system may include a first device (a source device) and a second device (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
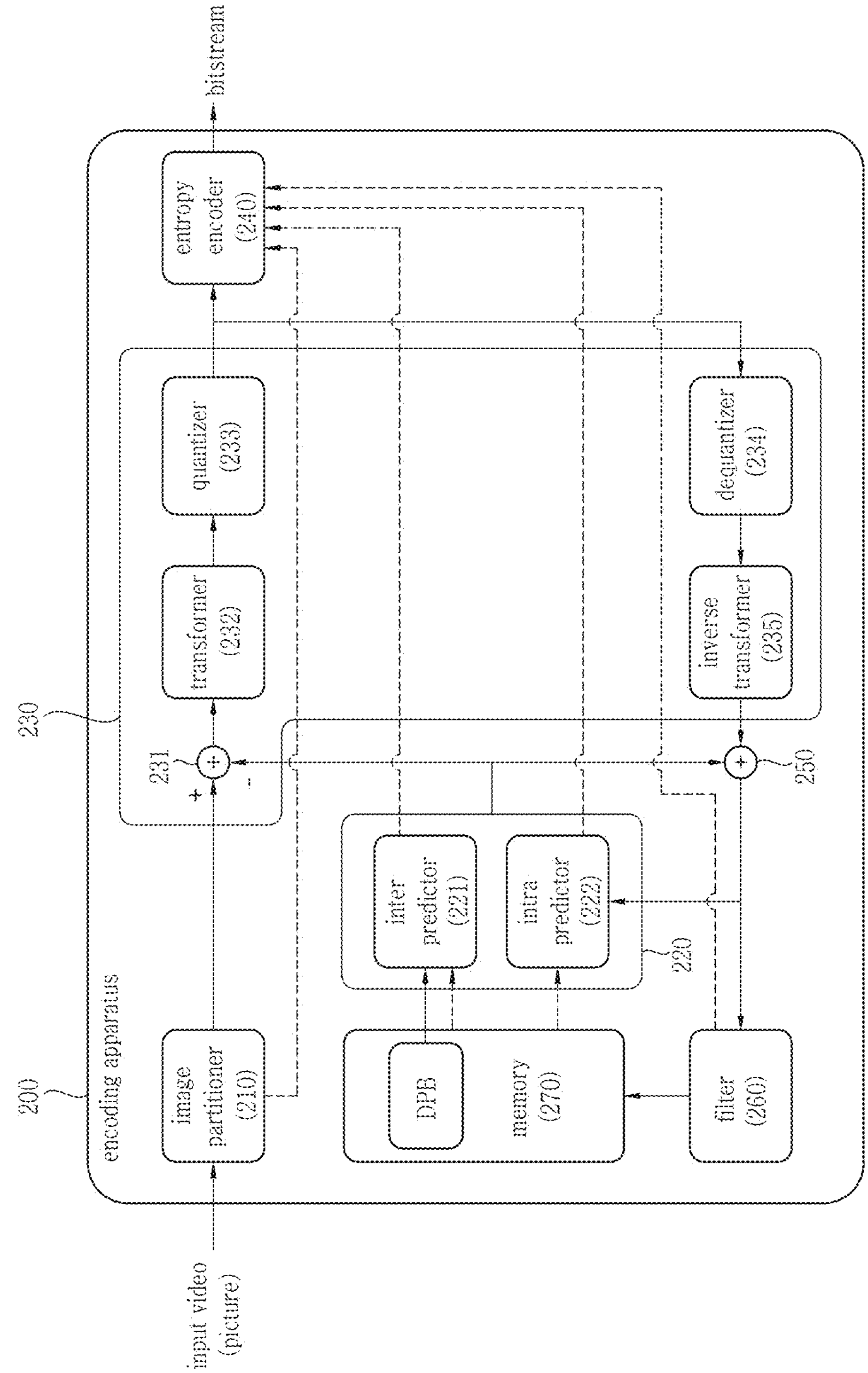
FIG. 2 is a diagram schematically illustrating a configuration of a video/image encoding apparatus applicable to embodiments of this document.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighbouring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighbouring block and the current block. The motion information may include a motion vector and a reference picture index. The motion information may further include inter prediction direction (L0 prediction, L1 prediction, Bi prediction, etc.) information. In the case of inter prediction, the neighbouring block may include a spatial neighbouring block present in the current picture and a temporal neighbouring block present in the reference picture. The reference picture including the reference block and the reference picture including the temporal neighbouring block may be the same or different. The temporal neighbouring block may be called a collocated reference block, a co-located CU (colCU), and the like, and the reference picture including the temporal neighbouring block may be called a collocated picture (colPic). For example, the inter predictor 221 may configure a motion information candidate list based on neighbouring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighbouring block as motion information of the current block. In the skip mode, unlike the merge mode, the residual signal may not be transmitted. In the case of the motion vector prediction (MVP) mode, the motion vector of the neighbouring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighbouring block or the motion information of the temporal neighbouring block. The memory 270 may store reconstructed samples of reconstructed blocks in the current picture and may transfer the reconstructed samples to the intra predictor 222.

Figure 3:
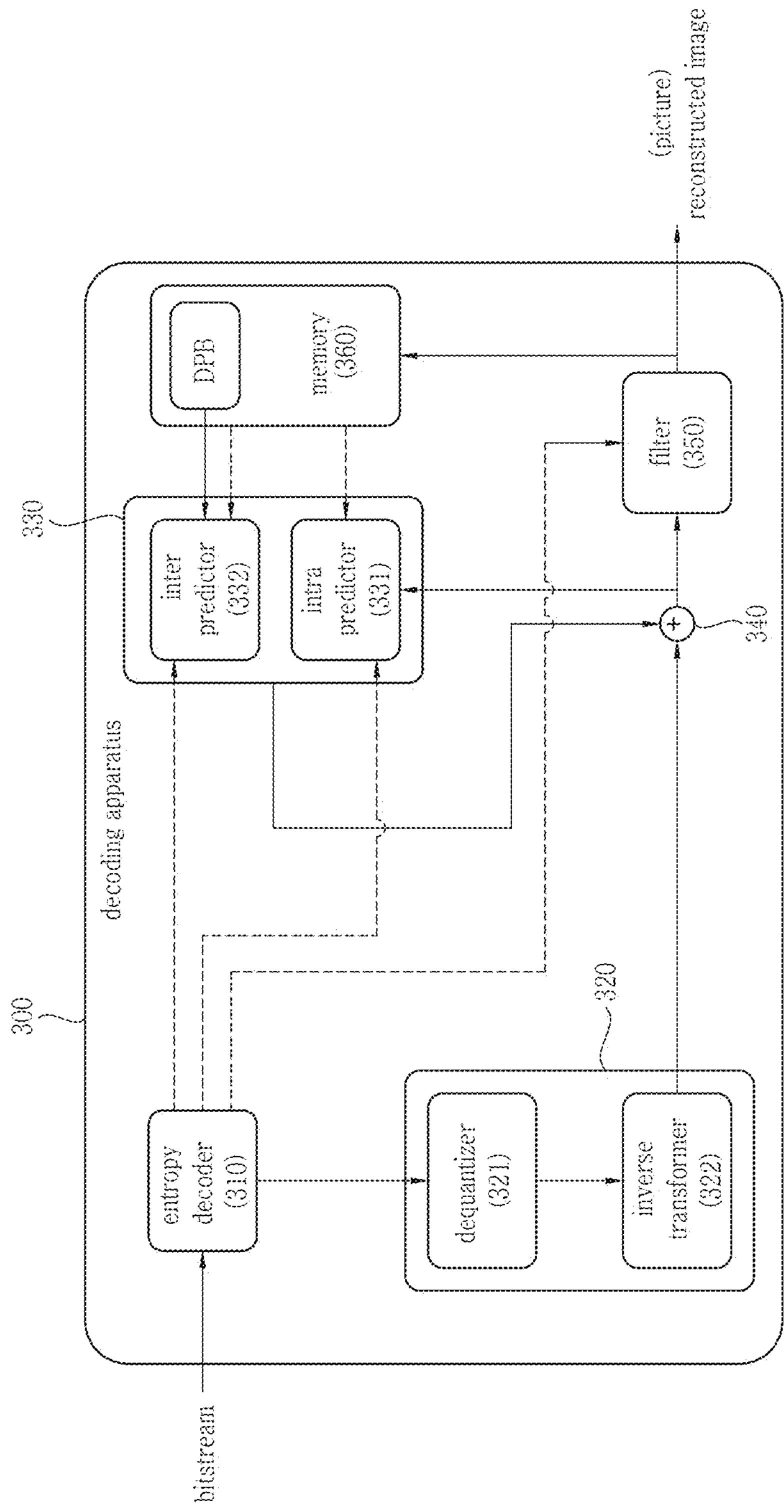
FIG. 3 is a diagram schematically illustrating a configuration of a video/image decoding apparatus applicable to embodiments of this document.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighbouring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighbouring block and the current block. The motion information may include a motion vector and a reference picture index. The motion information may further include inter prediction direction (L0 prediction, L1 prediction, Bi prediction, etc.) information. In the case of inter prediction, the neighbouring block may include a spatial neighbouring block present in the current picture and a temporal neighbouring block present in the reference picture. For example, the inter predictor 332 may configure a motion information candidate list based on neighbouring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighbouring block or the motion information of the temporal neighbouring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Meanwhile, if an intra prediction is performed, a correlation between samples may be used, and a difference between the original block and a prediction block, that is, a residual, may be obtained. The aforementioned transform and quantization may be applied to the residual. Accordingly, spatial redundancy can be reduced. Hereinafter, an encoding method and a decoding method using an intra prediction are specifically described.

An intra prediction refers to a prediction for generating prediction samples for a current block based on reference samples outside the current block within a picture (hereinafter a current picture) including the current block. In this case, the reference samples outside the current block may refer to samples adjacent to the current block. If an intra prediction is applied to the current block, neighbouring reference samples to be used for the intra prediction of the current block may be derived.

For example, when the size (width×height) of a current block is nW×nH, neighbouring reference samples of the current block may include a sample neighbouring the left boundary and a total of 2×nH samples neighbouring the bottom left of the current block, a sample neighbouring the top boundary and a total of 2×nW samples neighbouring the top right of the current block, and one sample neighbouring the left top of the current block. Alternatively, neighbouring reference samples of a current block may also include a plurality of columns of top neighbouring samples and a plurality of rows of left neighbouring samples. Furthermore, neighbouring reference samples of a current block may also include a total of nH samples neighbouring the right boundary of the current block having an nW×nH size, a total of nW samples neighbouring the bottom boundary of the current block and one sample neighbouring the bottom right of the current block.

In this case, some of the neighbouring reference samples of the current block have not been decoded or may not be available. In this case, the decoding apparatus may configure neighbouring reference samples to be used for a prediction by substituting unavailable samples with available samples. Alternatively, neighbouring reference samples to be used for a prediction may be constructed through the interpolation of available samples.

If neighbouring reference samples are derived, (i) a prediction sample may be derived based on an average or interpolation of the neighbouring reference samples of a current block, and (ii) a prediction sample may be derived based on a reference sample present in a specific (prediction) direction for the prediction sample among neighbouring reference samples of a current block. (i) may be applied when an intra prediction mode is a non-directional mode or a non-angular mode. (ii) may be applied when an intra prediction mode is a directional mode or an angular mode.

Further, the prediction sample may also be generated by the interpolation between a first neighbouring sample positioned in a prediction direction of the intra prediction mode of the current block and a second neighbouring sample positioned in an opposite direction of the prediction direction based on the prediction sample of the current block among the neighbouring reference samples. The aforementioned case may be called a linear interpolation intra prediction (LIP). Further, chroma prediction samples may also be generated based on luma samples using a linear model. This case may be called an LM mode.

Further, temporary prediction samples of the current block may be derived based on the filtered neighbouring reference samples, and the prediction sample of the current block may also be derived by weighted-summing at least one reference sample, which is derived according to the intra prediction mode among conventional neighbouring reference samples, that is, the neighbouring reference samples not filtered, and the temporary prediction sample. The aforementioned case may be called a position dependent intra prediction (PDPC).

Further, the prediction sample may be derived using the reference sample positioned in a prediction direction in a corresponding line by selecting a reference sample line with the highest prediction accuracy among the neighbouring multi-reference sample lines of the current block, and an intra prediction encoding may be performed by a method for indicating (signaling) the reference sample line used at this time to the decoding apparatus. The aforementioned case may be called multi-reference line (MRL) intra prediction or intra prediction based on the MRL.

Further, the intra prediction may be performed based on the same intra prediction mode by splitting the current block into vertical or horizontal sub-partitions, and the neighbouring reference samples may be derived and used in units of sub-partition. That is, in this case, the intra prediction mode for the current block is equally applied to the sub-partitions, and the neighbouring reference sample may be derived and used in units of sub-partition, thereby enhancing intra prediction performance in some cases. Such a prediction method may be called intra sub-partitions (ISP) intra prediction or intra prediction based on the ISP.

The aforementioned intra prediction methods may be called an intra prediction type separately from the intra prediction mode. The intra prediction type may be called various terms such as an intra prediction technique or an additional intra prediction mode. For example, the intra prediction type (or the additional intra prediction mode or the like) may include at least one of the aforementioned LIP, PDPC, MRL, and ISP. A general intra prediction method other than specific intra prediction types such as the LIP, the PDPC, the MRL, and the ISP may be called a normal intra prediction type. The normal intra prediction type may be generally applied if the specific intra prediction type is not applied, and the prediction may be performed based on the aforementioned intra prediction mode. Meanwhile, a post-processing filtering for the derived prediction sample may also be performed if necessary.

Figure 4:
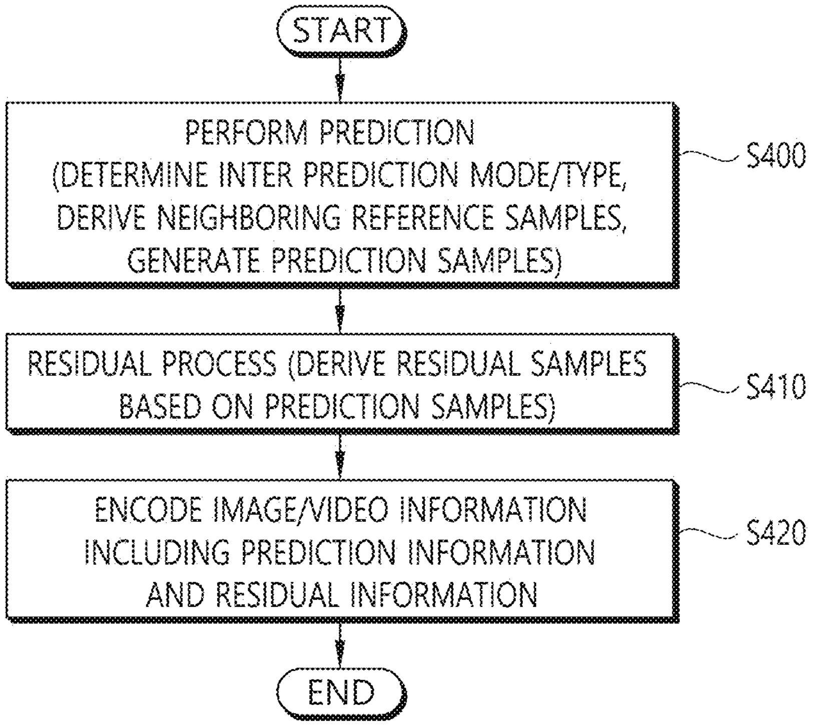
FIG. 4 shows an example of an image encoding method based on rough intra prediction to which embodiments of this document are applicable, and FIG. 5 schematically shows an intra predictor in an encoding apparatus.
Figure 5:
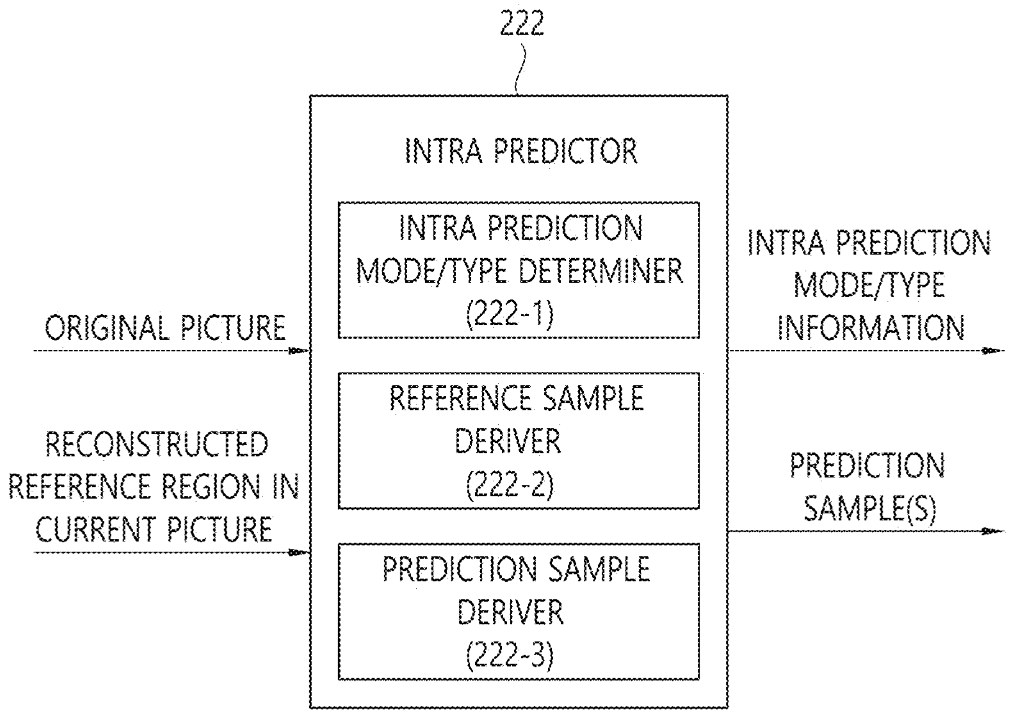

FIG. 4 schematically illustrates an example of an image encoding method based on intra prediction to which the exemplary embodiments of the present document are applicable, and FIG. 5 schematically illustrates the intra predictor in the encoding apparatus. The intra predictor in the encoding apparatus illustrated in FIG. 5 may also be applied to the intra predictor 222 of the encoding apparatus 200 illustrated in FIG. 2 equally or in correspondence thereto.

Referring to FIGS. 4 and 5, S400 may be performed by the intra predictor 222 of the encoding apparatus, and S410 may be performed by the residual processor 230 of the encoding apparatus. Specifically, S410 may be performed by the subtractor 231 of the encoding apparatus. In S420, prediction information may be derived by the intra predictor 222, and encoded by the entropy encoder 240. In S420, residual information may be derived by the residual processor 230, and encoded by the entropy encoder 240. The residual information indicates information on the residual samples. The residual information may include information on quantized transform coefficients for the residual samples. As described above, the residual samples may be derived by transform coefficients through the transformer 232 of the encoding apparatus, and the transform coefficients may be derived by quantized transform coefficients through the quantizer 233. The information on the quantized transform coefficients may be encoded by the entropy encoder 240 through a residual coding procedure.

The encoding apparatus performs the intra prediction for the current block (S400). The encoding apparatus may derive the intra prediction mode/type for the current block, derive the neighbouring reference samples of the current block, and generate the prediction samples in the current block based on the intra prediction mode/type and the neighbouring reference samples. Here, procedures of determining the intra prediction mode/type, deriving the neighbouring reference samples, and generating the prediction samples may also be simultaneously performed, and any one procedure may also be performed earlier than other procedures.

For example, the intra predictor 222 of the encoding apparatus may include an intra prediction mode/type determiner 222-1, a reference sample deriver 222-2, and a prediction sample deriver 222-3, in which the intra prediction mode/type determiner 222-1 may determine the intra prediction mode/type for the current block, the reference sample deriver 222-2 may derive the neighbouring reference samples of the current block, and the prediction sample deriver 222-3 may derive the prediction samples of the current block. Meanwhile, although not illustrated, if a prediction sample filtering procedure is performed, the intra predictor 222 may further include a prediction sample filter (not illustrated) as well. The encoding apparatus may determine a mode/a type applied to the current block among a plurality of intra prediction modes/types. The encoding apparatus may compare RD costs for the intra prediction modes/types and determine optimal intra prediction mode/type for the current block.

As described above, the encoding apparatus may also perform the prediction sample filtering procedure. The prediction sample filtering may be called a post filtering. Some or all of the prediction samples may be filtered by the prediction sample filtering procedure. The prediction sample filtering procedure may be omitted in some cases.

The encoding apparatus generates residual samples for the current block based on the (filtered) prediction samples (S410). The encoding apparatus may compare the prediction samples based on phases in original samples of the current block, and derive the residual samples.

The encoding apparatus may encode image information including the information on the intra prediction (prediction information) and the residual information on the residual samples (S420). The prediction information may include intra prediction mode information and intra prediction type information. The residual information may include a residual coding syntax. The encoding apparatus may derive the quantized transform coefficients by transforming/quantizing the residual samples. The residual information may include the information on the quantized transform coefficients.

The encoding apparatus may output the encoded image information in the form of a bitstream. The output bitstream may be delivered to the decoding apparatus through a storage medium or a network.

As described above, the encoding apparatus may generate the reconstructed picture (including reconstructed samples and reconstructed block). To this end, the encoding apparatus may derive (modified) residual samples by dequantizing/inversely transforming the quantized transform coefficients again. As described above, the reason of transforming/quantizing the residual samples and then dequantizing/inversely transforming them again is to derive the same residual samples as the residual samples derived by the decoding apparatus as described above. The encoding apparatus may generate the reconstructed block including the reconstructed samples for the current block based on the prediction samples and the (modified) residual samples. The reconstructed picture for the current picture may be generated based on the reconstructed block. As described above, an in-loop filtering procedure or the like may be further applied to the reconstructed picture.

Figure 6:
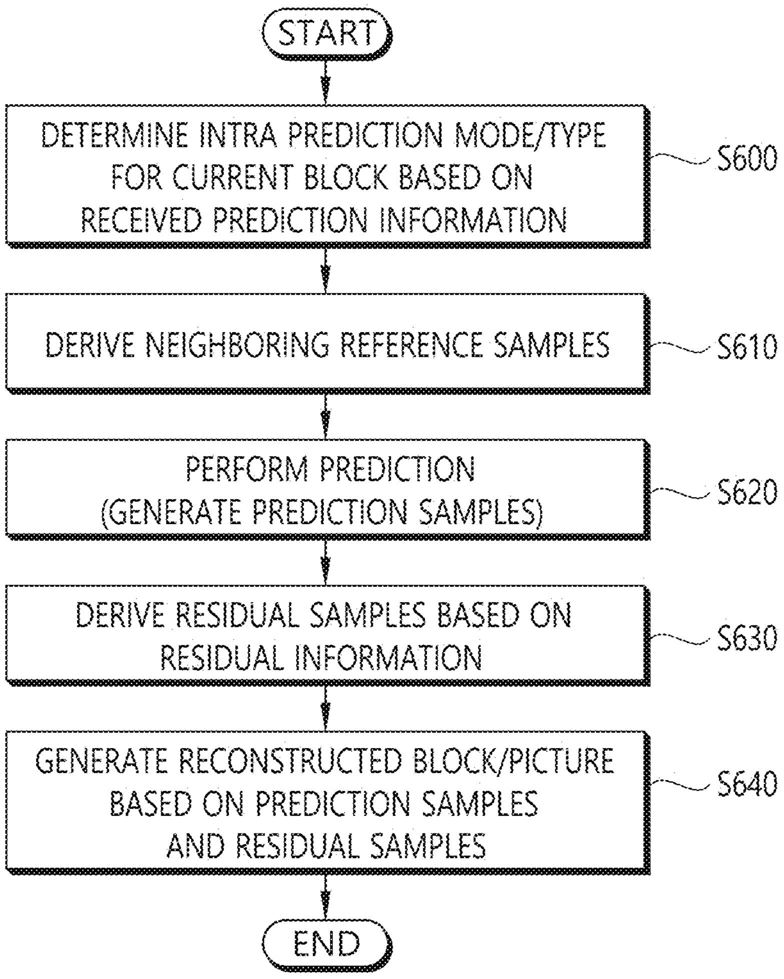
FIG. 6 shows an example of an image decoding method based on rough intra prediction to which embodiments of this document are applicable, and FIG. 7 schematically shows an intra predictor in a decoding apparatus.
Figure 7:
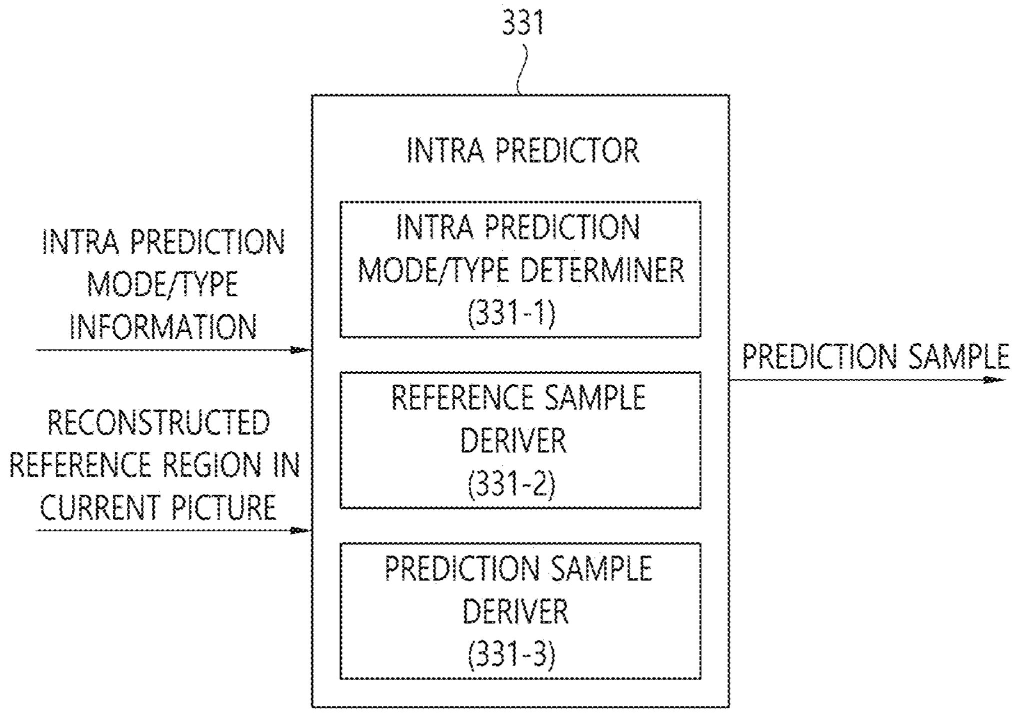

FIG. 6 schematically illustrates an example of an image decoding method based on intra prediction to which the exemplary embodiments of the present document are applicable, and FIG. 7 schematically illustrates the intra predictor in the decoding apparatus. The intra predictor in the decoding apparatus illustrated in FIG. 7 may also be applied to the intra predictor 331 of the decoding apparatus 300 illustrated in FIG. 3 equally or in correspondence thereto.

Referring to FIGS. 6 and 7, the decoding apparatus may perform an operation corresponding to the aforementioned operation performed by the encoding apparatus. S600 to S620 may be performed by the intra predictor 331 of the decoding apparatus, and the prediction information in S600 and the residual information in S630 may be acquired from the bitstream by the entropy decoder 310 of the decoding apparatus. The residual processor 320 of the decoding apparatus may derive the residual samples for the current block based on the residual information. Specifically, the dequantizer 321 of the residual processor 320 may derive the transform coefficients by performing the dequantization, based on the quantized transform coefficients derived based on the residual information, and the inverse transformer 322 of the residual processor derive the residual samples for the current block by inversely transforming the transform coefficients. S640 may be performed by the adder 340 or the reconstructor of the decoding apparatus.

The decoding apparatus may derive the intra prediction mode/type for the current block based on the received prediction information (intra prediction mode/type information) (S600). The decoding apparatus may derive the neighbouring reference samples of the current block (S610). The decoding apparatus generates the prediction samples in the current block based on the intra prediction mode/type and the neighbouring reference samples (S620). In this case, the decoding apparatus may perform the prediction sample filtering procedure. The prediction sample filtering may be called the post filtering. Some or all of the prediction samples may be filtered by the prediction sample filtering procedure. The prediction sample filtering procedure may be omitted in some cases.

The decoding apparatus generates the residual samples for the current block based on the received residual information (S630). The decoding apparatus may generate the reconstructed samples for the current block based on the prediction samples and the residual samples, and derive the reconstructed block including the reconstructed samples (S640). The reconstructed picture for the current picture may be generated based on the reconstructed block. As described above, the in-loop filtering procedure or the like may be further applied to the reconstructed picture.

Here, the intra predictor 331 of the decoding apparatus may include an intra prediction mode/type determiner 331-1, a reference sample deriver 331-2, and a prediction sample deriver 331-3, in which the intra prediction mode/type determiner 331-1 may determine the intra prediction mode/type for the current block based on the intra prediction mode/type information acquired by the entropy decoder 310, the reference sample deriver 331-2 may derive the neighbouring reference samples of the current block, and the prediction sample deriver 331-3 may derive the prediction samples of the current block. Meanwhile, although not illustrated, if the aforementioned prediction sample filtering procedure is performed, the intra predictor 331 may further include the prediction sample filter (not illustrated) as well.

The intra prediction mode information may include, for example, flag information (e.g., intra_luma_mpm_flag) indicating whether a most probable mode (MPM) is applied to the current block or whether a remaining mode is applied thereto. At this time, if the MPM is applied to the current block, the prediction mode information may further include index information (e.g., intra_luma_mpm_idx) indicating one of intra prediction mode candidates (MPM candidates). The intra prediction mode candidates (MPM candidates) may be composed of an MPM candidate list or an MPM list. Further, if the MPM is not applied to the current block, the intra prediction mode information may further include remaining mode information (e.g., intra_luma_mpm_remainder) indicating one of remaining intra prediction modes other than the intra prediction mode candidates (MPM candidates). The decoding apparatus may determine the intra prediction mode of the current block based on the intra prediction mode information.

Further, the intra prediction type information may be implemented in various forms. As an example, the intra prediction type information may include intra prediction type index information indicating one of the intra prediction types. As another example, the intra prediction type information may include at least one of reference sample line information (e.g., intra_luma_ref_idx) indicating whether the MRL is applied to the current block and which reference sample line is used if the MRL is applied, ISP flag information (e.g., intra_subpartitions_mode_flag) indicating whether the ISP is applied to the current block, ISP type information (e.g., intra_subpartitions_split_flag) indicating split types of the subpartitions if the ISP is applied, flag information indicating whether the PDCP is applied, or flag information indicating whether the LIP is applied. Further, the intra prediction type information may include an MIP flag indicating whether the MIP is applied to the current block.

The aforementioned intra prediction mode information and/or intra prediction type information may be encoded/decoded by the coding method described in the present document. For example, the aforementioned intra prediction mode information and/or intra prediction type information may be encoded/decoded by an entropy coding (e.g., CABAC, CAVLC) based on a truncated (rice) binary code.

Meanwhile, if the intra prediction is applied, the intra prediction mode applied to the current block may be determined using the intra prediction mode of the neighbouring block. For example, the decoding apparatus may select one of most probable mode (mpm) candidates, which are derived based on an intra prediction mode of a left block of the current block and an intra prediction mode of a top block thereof, based on the received mpm index, or select one of the remaining intra prediction modes, which are not included in the mpm candidates based on the remaining intra prediction mode information. Whether the intra prediction mode applied to the current block exists in the mpm candidates or exists in the remaining modes may be indicated based on an mpm flag (e.g., intra_luma_mpm_flag). A case where a value of the mpm flag is 1 may indicate that the intra prediction mode for the current block exists in the mpm candidates (mpm list), and a case where the value of the mpm flag is 0 may indicate that the intra prediction mode for the current block does not exist in the mpm candidates (mpm list). The mpm index may be signaled in the form of mpm_idx or intra_luma_mpm_idx syntax element, and the remaining intra prediction mode information may be signaled in the form of rem_intra_luma_pred_mode or intra_luma_mpm_remainder syntax element. For example, the remaining intra prediction mode information may index the remaining intra prediction modes not included in the mpm candidates among all of the intra prediction modes in the order of a prediction mode number to indicate one of them.

Generally, when a block for an image is split, a current block to be coded and a neighbouring block have similar image properties. Therefore, the current block and the neighbouring block are more likely to have the same or similar intra prediction modes. Therefore, the encoder may use the intra prediction mode of the neighbouring block to encode the intra prediction mode of the current block. For example, the encoder/decoder may constitute a most probable modes (MPM) list for the current block. The MPM list may also be referred to as an MPM candidate list. Here, the MPM may mean a mode used for improving the coding efficiency in consideration of the similarity between the current block and the neighbouring block upon coding the intra prediction mode.

Figure 8:
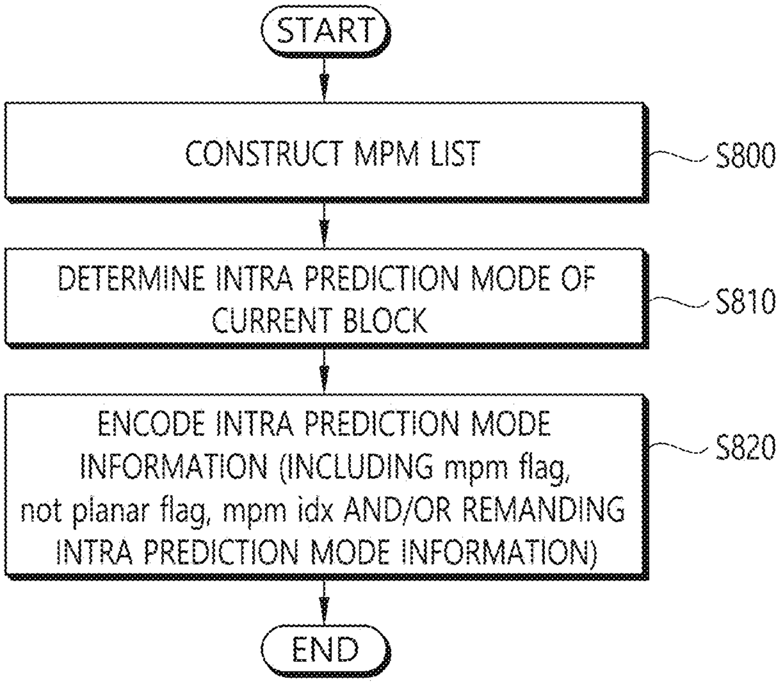
FIG. 8 shows an example of an MPM mode-based intra prediction method in an encoding apparatus to which embodiments of this document are applicable.

FIG. 8 illustrates an example of an intra prediction method based on the MPM mode in the encoding apparatus to which the exemplary embodiments of the present document are applicable.

Referring to FIG. 8, the encoding apparatus constructs the MPM list for the current block (S800). The MPM list may include candidate intra prediction modes (MPM candidates) which are more likely applied to the current block. The MPM list may also include the intra prediction mode of the neighbouring block, and further include specific intra prediction modes according to a predetermined method as well. A specific method for constructing the MPM list will be described later.

The encoding apparatus determines the intra prediction mode of the current block (S810). The encoding apparatus may perform the prediction based on various intra prediction modes, and determine an optimal intra prediction mode based on rate-distortion optimization (RDO) based on the above prediction. In this case, the encoding apparatus may also determine the optimal intra prediction mode using only the MPM candidates configured in the MPM list and a planar mode, or also determine the optimal intra prediction mode further using the remaining intra prediction modes as well as the MPM candidates configured in the MPM list and the planar mode.

Specifically, for example, if the intra prediction type of the current block is a specific type (e.g., LIP, MRL, or ISP) other than the normal intra prediction type, the encoding apparatus may determine the optimal intra prediction mode in consideration of only the MPM candidates and the planar mode as the intra prediction mode candidates for the current block. That is, in this case, the intra prediction mode for the current block may be determined only in the MPM candidates and the planar mode, and in this case, the mpm flag may be not encoded/signaled. In this case, the decoding apparatus may estimate that the mpm flag is 1 even without separate signaling of the mpm flag.

Generally, if the intra prediction mode of the current block is not the planar mode and one of the MPM candidates in the MPM list, the encoding apparatus generates the mpm index (mpm idx) indicating one of the MPM candidates. If the intra prediction mode of the current block does not exist even in the MPM list, the encoding apparatus generates the remaining intra prediction mode information indicating a mode such as the intra prediction mode of the current block among the remaining intra prediction modes not included in the MPM list (and the planar mode).

The encoding apparatus may encode the intra prediction mode information to output it in the form of the bitstream (S820). The intra prediction mode information may include the aforementioned mpm flag, not planar flag, mpm index, and/or remaining intra prediction mode information. Generally, the mpm index and the remaining intra prediction mode information have an alternative relationship and are not simultaneously signaled when indicating the intra prediction mode for one block. That is, the value of the mpm flag, 1 and the not planar flag or the mpm index are signaled together, or the value of the mpm flag, 0 and the remaining intra prediction mode information are signaled together. However, as described above, if the specific intra prediction type is applied to the current block, the mpm flag is not signaled and only the not planar flag and/or the mpm index may also be signaled. That is, in this case, the intra prediction mode information may also include only the not planar flag and/or the mpm index.

Figure 9:
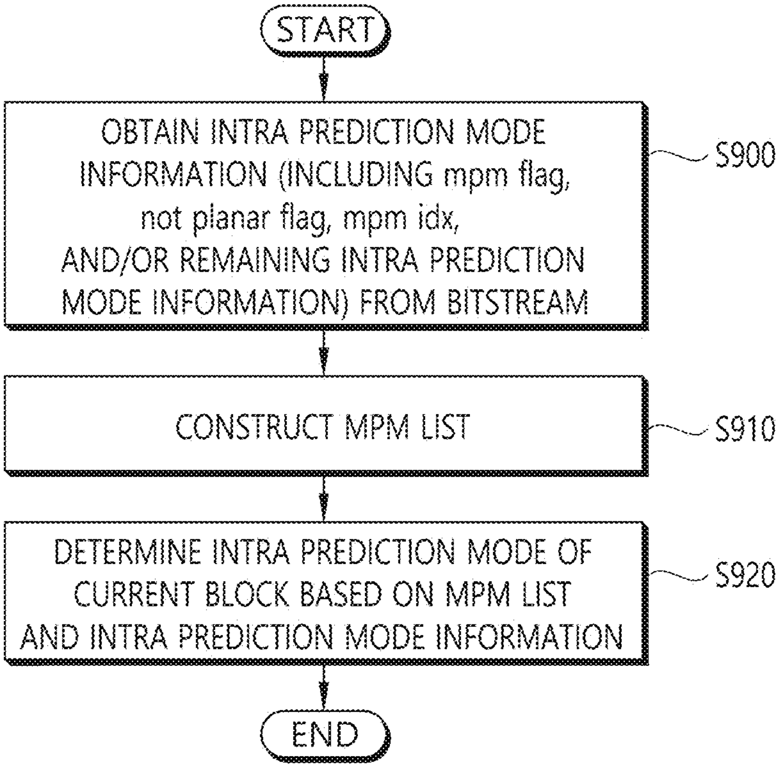
FIG. 9 shows an example of an MPM mode-based intra prediction method in a decoding apparatus to which embodiments of this document are applicable.

FIG. 9 illustrates an example of the intra prediction method based on the MPM mode in the decoding apparatus to which the exemplary embodiments of the present document are applicable. The decoding apparatus illustrated in FIG. 9 may determine the intra prediction mode corresponding to the intra prediction mode information determined and signaled by the encoding apparatus illustrated in FIG. 8.

Referring to FIG. 9, the decoding apparatus obtains the intra prediction mode information from the bitstream (S900). As described above, the intra prediction mode information may include at least one of the mpm flag, the not planar flag, the mpm index, and the remaining intra prediction mode.

The decoding apparatus constructs the MPM list (S910). The MPM list is composed of the same MPM list configured in the encoding apparatus. That is, the MPM list may also include the intra prediction mode of the neighbouring block, and further include the specific intra prediction modes according to a predetermined method as well. A specific method for constructing the MPM list will be described later.

Although it is illustrated that S910 is performed later than S900, it is illustrative, and S910 may also be performed earlier than S900 and S900 and S910 may also be simultaneously performed.

The decoding apparatus determines the intra prediction mode of the current block based on the MPM list and the intra prediction mode information (S920).

As an example, if the value of the mpm flag is 1, the decoding apparatus may derive the planar mode as the intra prediction mode of the current block or derive the candidate indicated by the mpm index among the MPM candidates in the MPM list (based on the not planar flag) as the intra prediction mode of the current block. Here, the MPM candidates may also indicate only the candidates included in the MPM list, or also include the planar mode which is applicable to a case where the value of the mpm flag is 1 as well as to the candidates included in the MPM list.

As another example, if the value of the mpm flag is 0, the decoding apparatus may derive the intra prediction mode indicated by the remaining intra prediction mode information among the remaining intra prediction modes, which are not included in the MPM list and the planar mode, as the intra prediction mode of the current block.

As still another example, if the intra prediction type of the current block is the specific type (e.g., LIP, MRL, or ISP), the decoding apparatus may also derive the planar mode or the candidate indicated by the mpm index in the MPM list as the intra prediction mode of the current block even without the confirmation of the mpm flag.

Meanwhile, an intra prediction mode may include non-directional (or non-angular) intra prediction modes and directional (or angular) intra prediction modes. For example, in the HEVC standard, intra prediction modes including 2 non-directional prediction modes and 33 directional prediction modes are used. The non-directional prediction modes may include a planar intra prediction mode, that is, No. 0, and a DC intra prediction mode, that is, No. 1. The directional prediction modes may include No. 2 to No. 34 intra prediction modes. The planar mode intra prediction mode may be called a planar mode, and the DC intra prediction mode may be called a DC mode.

Figure 10:
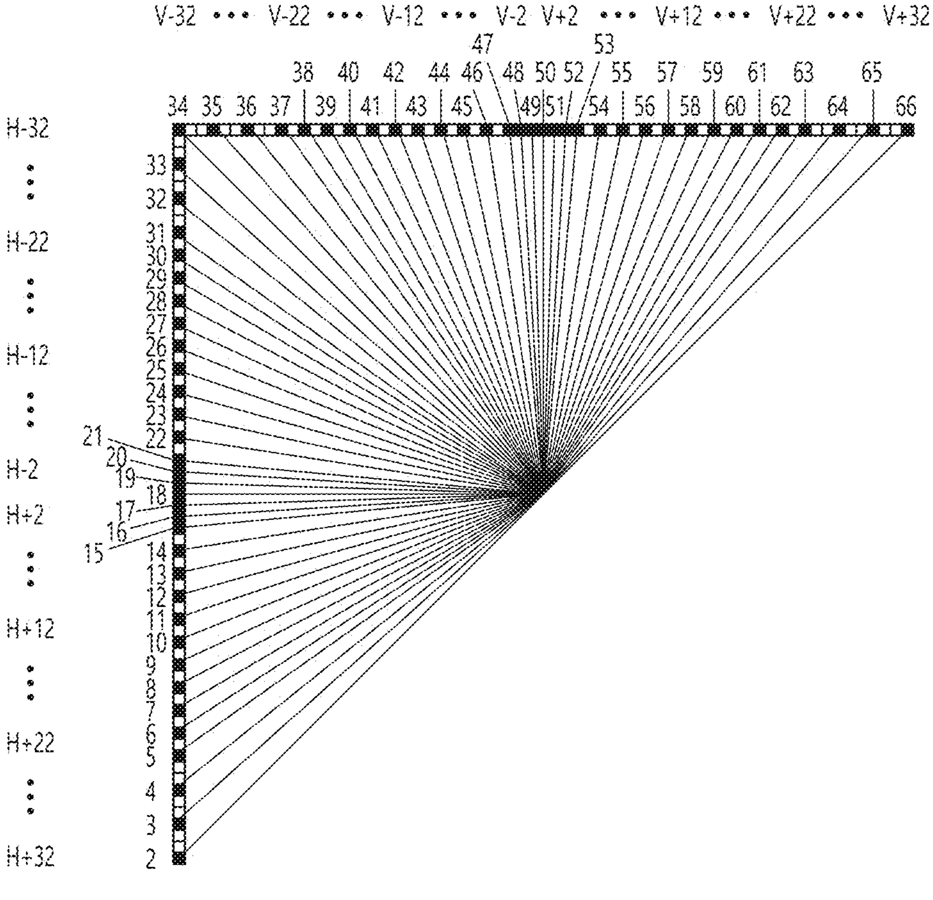
FIG. 10 shows an example of intra prediction modes to which embodiments of this document are applicable.

Alternatively, in order to capture a given edge direction proposed in natural video, the directional intra prediction modes may be extended from the existing 33 modes to 65 modes as in FIG. 10. In this case, the intra prediction modes may include 2 non-directional intra prediction modes and 65 directional intra prediction modes. The non-directional intra prediction modes may include a planar intra prediction mode, that is, No. 0, and a DC intra prediction mode, that is, No. 1. The directional intra prediction modes may include Nos. 2 to 66 intra prediction modes. The extended directional intra prediction modes may be applied to blocks having all sizes, and may be applied to both a luma component and a chroma component. However, this is an example, and embodiments of this document may be applied to a case where the number of intra prediction modes is different. A No. 67 intra prediction mode according to circumstances may be further used. The No. 67 intra prediction mode may indicate a linear model (LM) mode.

FIG. 10 illustrates an example of intra prediction modes to which the embodiment(s) of the present document may be applied.

Referring to FIG. 10, modes may be divided into intra prediction modes having horizontal directionality and intra prediction modes having vertical directionality based on a No. 34 intra prediction mode having a top left diagonal prediction direction. In FIG. 10, H and V mean horizontal directionality and vertical directionality, respectively. Each of numbers −32~32 indicate displacement of a 1/32 unit on a sample grid position. The Nos. 2 to 33 intra prediction modes have horizontal directionality, and the Nos. 34 to 66 intra prediction modes have vertical directionality. The No. 18 intra prediction mode and the No. 50 intra prediction mode indicate a horizontal intra prediction mode and a vertical intra prediction mode, respectively. The No. 2 intra prediction mode may be called a bottom left diagonal intra prediction mode, the No. 34 intra prediction mode may be called a top left diagonal intra prediction mode, and the No. 66 intra prediction mode may be called a top right diagonal intra prediction mode.

Meanwhile, the intra prediction may use the MRL using the multi-reference line. The MRL method may perform the intra prediction using, as the reference samples, the neighbouring samples positioned in a sample line away from the upper and/or left of the current block by one to three sample distances.

Figure 11:
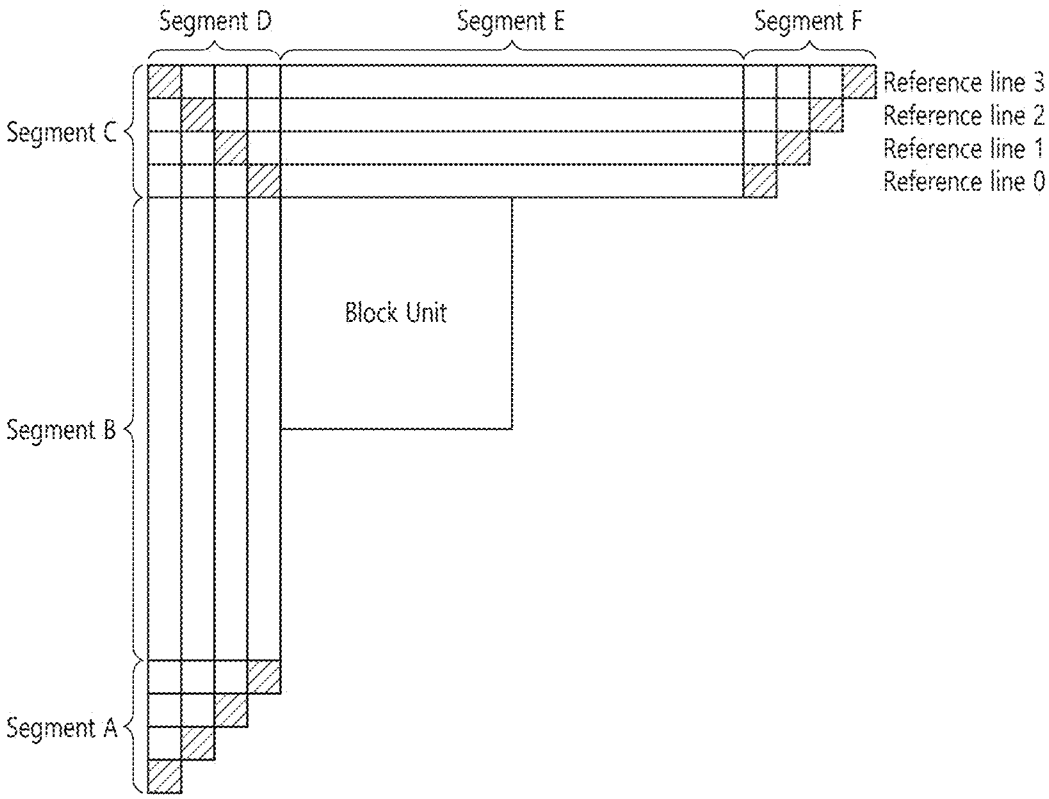
FIG. 11 shows an example of reference sample lines for intra prediction using multiple reference lines.

FIG. 11 illustrates an example of the reference sample lines for the intra prediction using the multi-reference line. A block unit illustrated in FIG. 11 may indicate the current block.

According to an exemplary embodiment, the intra prediction may use, as the reference samples for the prediction, the reference samples (or reference samples first closest to the current block, that is, reference samples positioned from the current block by a zero sample distance). According to another exemplary embodiment, the multi-reference line (MRL) intra prediction is a method using the reference samples positioned from the left and upper boundaries of the current block by a K sample distance (K is an integer of 1 or more), and may have more options and more accurate prediction performance for the reference samples than in the intra prediction using the reference samples closest to the current block (i.e., positioned from the current block by the zero sample distance). The reference sample of the current block may also be referred to as a neighbouring sample of the current block or a reference line sample of the current block, and the reference line sample may also be referred to as a sample on the reference line.

Referring to FIG. 11, the positions of the neighbouring reference samples positioned from the current block by 0, 1, 2, and 3 sample distances may be referred to as reference lines 0, 1, 2, and 3, respectively. The reference line may be referred to as a reference sample line, a reference sample row, or a reference sample column, or also be simply referred to as a line, a row, or a column. The reference lines 0, 1, 2, and 3 may be positioned in the order close to the current block. As an example, the multi-reference line intra prediction may be performed based on the reference lines 1, 2. As another example, the multi-reference line intra prediction may be performed based on the reference lines 1, 3. However, the multi-reference line intra prediction according to the present document is not necessarily limited to these examples.

Hereinafter, the present document proposes a method for constructing the MPM candidate list for the intra prediction using a zero reference line. The zero reference line indicates the reference line 0 as described above, and indicates samples positioned in the reference line first closest to the current block, that is, reference samples positioned from the current block by the 0 sample distance. For example, the zero reference line may include samples of a left reference line first closest to a left boundary of the current block and samples of an upper reference line first closest to an upper boundary of the current block. Further, the intra prediction may be performed by constructing the proposed MPM candidate list, thereby enhancing the intra prediction coding efficiency and enhancing the prediction performance.

Table 1 below shows an algorithm (i.e., specification) exemplarily indicating a method for generating the MPM candidate list for the intra prediction using the zero reference line. That is, the method for generating the MPM candidate list according to the algorithm shown in Table 1 below may be implemented.

TABLE 1

Input to this process are:
a luma location ( xCb , yCb ) specifying the top-left sample of the current luma coding block relative to the top-left luma sample of the current picture,
a variable cbWidth specifying the width of the current coding block in luma samples,
a variable cbHeight specifying the height of the current coding block in luma samples.
In this process, the luma intra prediction mode IntraPredModeY[ xCb ][ yCb ] is derived.
Table 8-1 specifies the value for the intra prediction mode IntraPredModeY[ xCb ][ yCb ] and the associated names.
Table 8-1 - Specification of intra prediction mode and associated names

| Intra prediction mode | Associated name |
|---|---|
| 0 | INTRA_PLANAR |
| 1 | INTRA_DC |
| 2..66 | INTRA_ANGULAR2..INTRA_ANGULAR66 |
| 81..83 | INTRA_LT_CCLM, INTRA_L_CCLM, INTRA_T_CCLM |

TABLE 1-continued

NOTE - : The intra prediction modes INTRA_LT_CCLM, INTRA_L_CCLM and INTRA_T_CCLM are only applicable to chroma components.
IntraPredModeY[ xCb ][ yCb ] is derived by the following ordered steps:
The neighbouring locations ( xNbA, yNbA ) and ( xNbB, yNbB ) are set equal to ( xCb − 1, yCb + cbHeight − 1 ) and ( xCb + cbWidth − 1, yCb − 1 ), respectively.
For X being replaced by either A or B, the variables candIntraPredModeX are derived as follows:
The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xNbX, yNbX ) as inputs, and the output is assigned to availableX.
The candidate intra prediction mode candIntraPredModeX is derived as follows:
If one or more of the following conditions are true, candIntraPredModeX is set equal to INTRA_PLANAR.
The variable availableX is equal to FALSE.
CuPredMode[ xNbX ][ yNbX ] is not equal to MODE_INTRA and ciip_flag[ xNbX ][ yNbX ] is not equal to 1.
pcm_flag[ xNbX ][ yNbX ] is equal to 1.
X is equal to B and yCb − 1 is less than ( ( yCb >> CtbLog2SizeY ) << CtbLog2SizeY ).
Otherwise, candIntraPredModeX is set equal to IntraPredModeY[ xNbX ][ yNbX ].
The candModeList[ x ] with x = 0..5 is derived as follows:
If candIntraPredModeB is equal to candIntraPredModeA and candIntraPredModeA is greater than INTRA_DC, candModeList[ x ] with x = 0..5 is derived as follows:
If IntraLumaRefLineIdx[ xCb ][ yCb ] is equal to 0, the following applies:
candModeList[ 0 ] = candIntraPredModeA (8-4)
candModeList[ 1 ] = INTRA_PLANAR (8-5)
candModeList[ 2 ] = INTRA_DC (8-6)
candModeList[ 3 ] = 2 + ( ( candIntraPredModeA + 61 ) % 64 ) (8-7)
candModeList[ 4 ] = 2 + ( ( candIntraPredModeA − 1 ) % 64 ) (8-8)
candModeList[ 5 ] = 2 + ( ( candIntraPredModeA + 60 ) % 64 ) (8-9)
Otherwise (IntraLumaRefLineIdx[ xCb ][ yCb ] is not equal to 0), the following applies:
candModeList[ 0 ] = candIntraPredModeA (8-10)
candModeList[ 1 ] = 2 + ( ( candIntraPredModeA + 61 ) % 64 ) (8-11)
candModeList[ 2 ] = 2 + ( ( candIntraPredModeA − 1 ) % 64 ) (8-12)
candModeList[ 3 ] = 2 + ( ( candIntraPredModeA + 60 ) % 64 ) (8-13)
candModeList[ 4 ] = 2 + ( candIntraPredModeA % 64 ) (8-14)
candModeList[ 5 ] = 2 + ( ( candIntraPredModeA + 59 ) % 64 ) (8-15)
Otherwise if candIntraPredModeB is not equal to candIntraPredModeA and candIntraPredModeA or candIntraPredModeB is greater than INTRA_DC, the following applies:
The variables minAB and maxAB are derived as follows:
minAB = Min( candIntraPredModeA, candIntraPredModeB ) (8-16)
maxAB = Max( candIntraPredModeA, candIntraPredModeB ) (8-17)
If candIntraPredModeA and candIntraPredModeB are both greater than INTRA_DC, candModeList[ x ] with x = 0..5 is derived as follows:
candModeList[ 0 ] = candIntraPredModeA (8-18)
candModeList[ 1 ] = candIntraPredModeB (8-19)
If IntraLumaRefLineIdx[ xCb ][ yCb ] is equal to 0, the following applies:
candModeList[ 2 ] = INTRA_PLANAR (8-20)
candModeList[ 3 ] = INTRA_DC (8-21)
If maxAB − minAB is in the range of 2 to 62, inclusive, the following applies:
candModeList[ 4 ] = 2 + ( ( maxAB + 61 ) % 64 ) (8-22)
candModeList[ 5 ] = 2 + ( ( maxAB − 1 ) % 64 ) (8-23)
Otherwise, the following applies:
candModeList[ 4 ] = 2 + ( ( maxAB + 60 ) % 64 ) (8-24)
candModeList[ 5 ] = 2 + ( ( maxAB ) % 64 ) (8-25)
Otherwise (IntraLumaRefLineIdx[ xCb ][ yCb ] is not equal to 0), the following applies:
If maxAB − minAB is equal to 1, the following applies:
candModeList[ 2 ] = 2 + ( ( minAB + 61 ) % 64 ) (8-26)
candModeList[ 3 ] = 2 + ( ( maxAB − 1 ) % 64 ) (8-27)
candModeList[ 4 ] = 2 + ( ( minAB + 60 ) % 64 ) (8-28)
candModeList[ 5 ] = 2 + ( maxAB % 64 ) (8-29)
Otherwise if maxAB − minAB is equal to 2, the following applies:
candModeList[ 2 ] = 2 + ( ( minAB − 1 ) % 64 ) (8-30)
candModeList[ 3 ] = 2 + ( ( minAB + 61 ) % 64 ) (8-31)
candModeList[ 4 ] = 2 + ( ( maxAB − 1 ) % 64 ) (8-32)
candModeList[ 5 ] = 2 + ( ( minAB + 60 ) % 64 ) (8-33)
Otherwise if maxAB − minAB is greater than 61, the following applies:
candModeList[ 2 ] = 2 + ( ( minAB − 1 ) % 64 ) (8-34)
candModeList[ 3 ] = 2 + ( ( maxAB + 61 ) % 64 ) (8-35)
candModeList[ 4 ] = 2 + ( minAB % 64 ) (8-36)
candModeList[ 5 ] = 2 + ( ( maxAB + 60 ) % 64 ) (8-37)
Otherwise, the following applies:
candModeList[ 2 ] = 2 + ( ( minAB + 61 ) % 64 ) (8-38)
candModeList[ 3 ] = 2 + ( ( minAB − 1 ) % 64 ) (8-39)
candModeList[ 4 ] = 2 + ( ( maxAB + 61 ) % 64 ) (8-40)
candModeList[ 5 ] = 2 + ( ( maxAB − 1 ) % 64 ) (8-41)
Otherwise (candIntraPredModeA or candIntraPredModeB is greater than INTRA_DC), candModeList[ x ] with x = 0..5 is derived as follows:
If IntraLumaRefLineIdx[ xCb ][ yCb ] is equal to 0, the following applies:
candModeList[ 0 ] = candIntraPredModeA (8-42)
candModeList[ 1 ] = candIntraPredModeB (8-43)

TABLE 1-continued

| |
|---|
| candModeList[ 2 ] = 1 − minAB (8-44) |
| candModeList[ 3 ] = 2 + ( ( maxAB + 61 ) % 64 ) (8-45) |
| candModeList[ 4 ] = 2 + ( ( maxAB − 1 ) % 64 ) (8-46) |
| candModeList[ 5 ] = 2 + ( ( maxAB + 60 ) % 64 ) (8-47) |
| Otherwise (IntraLumaRefLineIdx[ xCb ][ yCb ] is not equal to 0), the following applies: |
| candModeList[ 0 ] = maxAB (8-48) |
| candModeList[ 1 ] = 2 + ( ( maxAB + 61 ) % 64 ) (8-49) |
| candModeList[ 2 ] = 2 + ( ( maxAB − 1 ) % 64 ) (8-50) |
| candModeList[ 3 ] = 2 + ( ( maxAB + 60 ) % 64 ) (8-51) |
| candModeList[ 4 ] = 2 + ( maxAB % 64 ) (8-52) |
| candModeList[ 5 ] = 2 + ( ( maxAB + 59 ) % 64 ) (8-53) |
| Otherwise, the following applies: |
| If IntraLumaRefLineIdx[ xCb ][ yCb ] is equal to 0, the following applies: |
| candModeList[ 0 ] = candIntraPredModeA (8-54) |
| candModeList[ 1 ] = ( candModeList[0] = = INTRA_PLANAR ) ? INTRA_DC : INTRA_PLANAR (8-55) |
| candModeList[ 2 ] = INTRA ANGULAR50 (8-56) |
| candModeList[ 3 ] = INTRA_ANGULAR18 (8-57) |
| candModeList[ 4 ] = INTRA ANGULAR46 (8-58) |
| candModeList[ 5 ] = INTRA_ANGULAR54 (8-59) |
| Otherwise (IntraLumaRefLineIdx[ xCb ][ yCb ] is not equal to 0), the following applies: |
| candModeList[ 0 ] = INTRA_ANGULAR50 (8-60) |
| candModeList[ 1 ] = INTRA_ANGULAR18 (8-61) |
| candModeList[ 2 ] = INTRA_ANGULAR2 (8-62) |
| candModeList[ 3 ] = INTRA_ANGULAR34 (8-63) |
| candModeList[ 4 ] = INTRA_ANGULAR66 (8-64) |
| candModeList[ 5 ] = INTRA_ANGULAR26 (8-65) |
| IntraPredModeY[ xCb ][ yCb ] is derived by applying the following procedure: |
| If intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ]. |
| Otherwise, IntraPredModeY[ xCb ][ yCb ] is derived by applying the following ordered steps: |
| When candModeList[ i ] is greater than candModeList[ j ] for i = 0..4 and for each i, j = ( i + 1 )..5, both values are swapped as follows: |
| ( candModeList[ i ], candModeList[ j ] ) = Swap( candModeList[ i ], candModeList[ j ] ) (8-66) |
| IntraPredModeY[ xCb ][ yCb ] is derived by the following ordered steps: |
| IntraPredModeY[ xCb ][ yCb ] is set equal to intra_luma_mpm_remainder[ xCb ][ yCb ]. |
| For i equal to 0 to 5, inclusive, when IntraPredModeY[ xCb ][ yCb ] is greater than or equal to candModeList[ i ], the value of IntraPredModeY[ xCb ][ yCb ] is incremented by one. |
| The variable IntraPredModeY[ x ][ y ] with x = xCb..xCb + cbWidth − 1 and y = yCb..yCb + cbHeight − 1 is set to be equal to IntraPredModeY[ xCb ][ yCb ]. |

The method for generating the MPM candidate list shown in Table 1 generates the MPM candidates in consideration of various cases, but does not generate the MPM candidate list preferentially in consideration of the planar mode. However, if the intra prediction using the zero reference line is performed, the planar mode may be more likely to be applied, and in this case, it may be efficient to generate the MPM candidate by giving priority to the planar mode. Therefore, hereinafter, the present document proposes the method for generating the MPM candidate list by giving priority to the planar mode when satisfying specific conditions only when the intra prediction is performed using the zero reference line. In this case, the coding (i.e., encoding/decoding) may be performed by assigning a fewer number of bits to the planar mode with high frequency of occurrence, thereby enhancing the coding efficiency.

According to the exemplary embodiment, an intra prediction mode of a left neighbouring block (i.e., left mode) and an intra prediction mode of an upper neighbouring block (i.e., upper mode) may be derived based on the left neighbouring block and upper neighbouring block of the current block. Here, the left neighbouring block may indicate the left neighbouring block positioned at the lowermost portion of the left neighbouring blocks adjacent to the left of the current block, and the upper neighbouring block may indicate the upper neighbouring block positioned at the rightmost portion of the upper neighbouring blocks adjacent to the upper of the current block. For example, if the size of the current block is W×H, an x-component of a top-left sample position of the current block is xN, and a y-component thereof is yN, the left neighbouring block may be a block including a sample of a (xN−1, yN+H−1) coordinate, and the upper neighbouring block may be a block including a sample of a (xN+W−1, yN−1) coordinate.

At this time, if the left mode and the upper mode are different intra prediction modes and both the left mode and the upper mode have mode numbers greater than that of a DC mode, the MPM candidate list may be generated as shown in Table 2 below.

TABLE 2

| |
|---|
| Otherwise if candIntraPredModeB is not equal to candIntraPredModeA and candIntraPredModeA or candIntraPredModeB is greater than INTRA_DC, the following applies: |
| The variables minAB and maxAB are derived as follows: |
| minAB = Min( candIntraPredModeA, candIntraPredModeB ) (8-16) |
| maxAB = Max( candIntraPredModeA, candIntraPredModeB ) (8-17) |
| If IntraLumaRefLineIdx[ xCb ][ yCb ] is equal to 0, the following applies: |
| If candIntraPredModeA and candIntraPredModeB are both greater than INTRA_DC, candModeList[ x ] with x = 0..5 is derived as follows: |

TABLE 2-continued

| | |
|---|---|
| candModeList[ 0 ] = candIntraPredModeA | (8-18) |
| candModeList[ 1 ] = INTRA_PLANAR | (8-19) |
| candModeList[ 2 ] = candIntraPredModeB | (8-20) |
| candModeList[ 3 ] = INTRA_DC | (8-21) |
| If maxAB − minAB is in the range of 2 to 62, inclusive, the following applies: | |
| candModeList[ 4 ] = 2 + ( ( maxAB + 61 ) % 64 ) | (8-22) |
| candModeList[ 5 ] = 2 + ( ( maxAB − 1 ) % 64 ) | (8-23) |
| Otherwise, the following applies: | |
| candModeList[ 4 ] = 2 + ( ( maxAB + 60 ) % 64 ) | (8-24) |
| candModeList[ 5 ] = 2 + ( ( maxAB ) % 64 ) | (8-25) |

The method shown in Table 1 first inserts the left mode and the upper mode in the MPM candidate list, and then adds the planar mode and the DC mode to the MPM candidate list, but the method shown in Table 2 first inserts the left mode in the MPM candidate list, and then adds the planar mode thereto. Further, thereafter, the method adds the upper mode and the DC mode to the MPM candidate list in turn.

For example, according to Table 2, if the intra prediction is performed using the zero reference line (e.g., a case where IntraLumaRefLinkIdx=0) and if the left mode (e.g., candIntraPredModeA) and the upper mode (e.g., candIntraPredModeB) are not the same and two modes have mode numbers greater than that of the DC mode (e.g., first mode number), the left mode (e.g., candIntraPredModeA) may be inserted into an index value 0 position (e.g., candModeList[0]) in the MPM candidate list. Further, the planar mode (e.g., INTRA_PLANAR) may be inserted into an index value 1 position (e.g., candModeList[1]) in the MPM candidate list. Further, the upper mode (e.g., candIntraPredModeB) may be inserted into an index value 2 position (e.g., candModeList[2]) in the MPM candidate list, and the DC mode (e.g., INTRA_DC) may be inserted into an index value 3 position (e.g., candModeList[3]) in the MPM candidate list. Thereafter, the remaining MPM candidates may be derived based on a difference value of the mode numbers between the left mode (e.g., candIntraPredModeA) and the upper mode (e.g., candIntraPredModeB) and added to index value 4, 5 positions in the MPM candidate list.

If the MPM candidate list is constructed by the method shown in Table 2, the planar mode may have priority over the upper mode (i.e., the planar mode may be first positioned in the MPM candidate list), thereby performing the coding by assigning a fewer number of bits.

Another exemplary embodiment may derive the intra prediction mode of the left neighbouring block (i.e., left mode) and the intra prediction mode of the upper neighbouring block (i.e., upper mode) based on the left neighbouring block and upper neighbouring block of the current block. Here, the left neighbouring block may indicate the left neighbouring block positioned at the lowermost portion of the left neighbouring blocks adjacent to the left of the current block, and the upper neighbouring block may indicate the upper neighbouring block positioned at the rightmost portion of the upper neighbouring blocks adjacent to the upper of the current block. For example, if the size of the current block is W×H, the x-component of the top-left sample position of the current block is xN, and the y-component thereof is yN, the left neighbouring block may be the block including the sample of the (xN−1, yN+H−1) coordinate, and the upper neighbouring block may be the block including the sample of the (xN+W−1, yN−1) coordinate.

At this time, if the left mode and the upper mode are different intra prediction modes and both the left mode and the upper mode have mode numbers greater than that of the DC mode, the MPM candidate list may be generated as shown in Table 3 below. That is, the method shown in Table 3 below may construct the MPM candidate list by assigning top priority to the planar mode.

TABLE 3

| | |
|---|---|
| Otherwise if candIntraPredModeB is not equal to candIntraPredModeA and candIntraPredModeA or candIntraPredModeB is greater than INTRA_DC, the following applies: | |
| The variables minAB and maxAB are derived as follows: | |
| minAB = Min( candIntraPredModeA, candIntraPredModeB ) | (8-16) |
| maxAB = Max( candIntraPredModeA, candIntraPredModeB ) | (8-17) |
| If IntraLumaRefLineIdx[ xCb ][ yCb ] is equal to 0, the following applies: | |
| If candIntraPredModeA and candIntraPredModeB are both greater than INTRA_DC, | |
| candModeList[ x ] with x = 0..5 is derived as follows: | |
| candModeList[ 0 ] = INTRA_PLANAR | (8-18) |
| candModeList[ 1 ] = candIntraPredModeA | (8-19) |
| candModeList[ 2 ] = candIntraPredModeB | (8-20) |
| candModeList[ 3 ] = INTRA_DC | (8-21) |
| If maxAB − minAB is in the range of 2 to 62, inclusive, the following applies: | |
| candModeList[ 4 ] = 2 + ( ( maxAB + 61 ) % 64 ) | (8-22) |
| candModeList[ 5 ] = 2 + ( ( maxAB − 1 ) % 64 ) | (8-23) |
| Otherwise, the following applies: | |
| candModeList[ 4 ] = 2 + ( ( maxAB + 60 ) % 64 ) | (8-24) |
| candModeList[ 5 ] = 2 + ( ( maxAB ) % 64 ) | (8-25) |

The method shown in Table 3 constructs the planar mode to be first positioned in the MPM candidate list, and then adds the left mode, the upper mode, and the DC mode to the MPM candidate list in turn.

For example, according to Table 3, if the intra prediction is performed using the zero reference line (e.g., a case where intraLumaRefLineIdx=0) and if the left mode (e.g., candIntraPredModeA) and the upper mode (e.g., candIntraPredModeB) are not the same and two modes have mode numbers greater than that of the DC mode (e.g., first mode number), the planar mode (e.g., INTRA_PLANAR) may be inserted into the index value 0 position (e.g., candModeList

[0]) in the MPM candidate list. Further, the left mode (e.g., candIntraPredModeA) may be inserted into the index value 1 position (e.g., candModeList[1]) in the MPM candidate list, and the upper mode (e.g., candIntraPredModeB) may be inserted into the index value 2 position (e.g., candModeList [2]) in the MPM candidate list. Further, the DC mode (e.g., INTRA_DC) may be inserted into the index value 3 position (e.g., candModeList[3]) in the MPM candidate list. Thereafter, the remaining MPM candidates may be derived based on a difference value of the mode numbers between the left mode (e.g., candIntraPredModeA) and the upper mode (e.g., candIntraPredModeB) and added to the index value 4, 5 positions in the MPM candidate list.

If the MPM candidate list is constructed by the method shown in Table 3, the planar mode is positioned at the frontmost side in the MPM candidate list, thereby having top priority over other MPM candidates. Therefore, the planar mode may be preferentially constructed as the candidate intra prediction mode of the current block. Further, the signaling and the coding may be efficiently performed using a fewer number of bits.

Still another exemplary embodiment may derive the intra prediction mode of the left neighbouring block (i.e., left mode) and the intra prediction mode of the upper neighbouring block (i.e., upper mode) based on the left neighbouring block and upper neighbouring block of the current block. Here, the left neighbouring block may indicate the left neighbouring block positioned at the lowermost portion of the left neighbouring blocks adjacent to the left of the current block, and the upper neighbouring block may indicate the upper neighbouring block positioned at the rightmost portion of the upper neighbouring blocks adjacent to the upper of the current block. For example, if the size of the current block is W×H, the x-component of the top-left sample position of the current block is xN, and the y-component thereof is yN, the left neighbouring block may be the block including the sample of the (xN−1, yN+H−1) coordinate, and the upper neighbouring block may be the block including the sample of the (xN+W−1, yN−1) coordinate.

At this time, if the left mode and the upper mode are different intra prediction modes and one of the left mode and the upper mode is the planar mode, the MPM candidate list may be generated as shown in Table 4 below.

TABLE 4

| | |
|---|---|
| Otherwise (candIntraPredModeA or candIntraPredModeB is greater than INTRA_DC), candModeList[ x ] with x = 0..5 is derived as follows: | |
| If IntraLumaRefLineIdx[ xCb ][ yCb ] is equal to 0, the following applies: | |
| If candIntraPredModeA == INTRA_PLANAR \|\| candIntraPredModeB == INTRA_PLANAR | |
| candModeList[ 0 ] = INTRA_PLANAR | (8-42) |
| candModeList[ 1 ] = (candIntraPredModeA < candIntraPredModeB) ? candIntraPredModeB : candIntraPredModeA | (8-43) |
| candModeList[ 2 ] = 1 − minAB | (8-44) |
| candModeList[ 3 ] = 2 + ( ( maxAB + 61 ) % 64 ) | (8-45) |
| candModeList[ 4 ] = 2 + ( ( maxAB − 1 ) % 64 ) | (8-46) |
| candModeList[ 5 ] = 2 + ( ( maxAB + 60 ) % 64 ) | (8-47) |

The method shown in Table 4 constructs the planar mode to be first positioned in the MPM candidate list, and then adds candidate modes other than the planar mode to the MPM candidate list.

For example, according to Table 4, if the intra prediction is performed using the zero reference line (e.g., a case where intraLumaRefLineIdx=0) and if the left mode (e.g., candIntraPredModeA) and the upper mode (e.g., candIntraPredModeB) are not the same and one of two modes is the planar mode, the planar mode (e.g., INTRA_PLANAR) may be inserted into the index value 0 position (e.g., candModeList [0]) in the MPM candidate list. Further, the mode other than the planar mode of the left mode and the upper mode may be inserted into the index value 1 position (e.g., candModeList[1]) in the MPM candidate list. Further, the DC mode (e.g., mode derived by 1−minAB) may be inserted into the index value 2 position (e.g., candModeList[2]) in the MPM candidate list. Thereafter, the remaining MPM candidates may be derived based on a greater mode number among the left mode (e.g., candIntraPredModeA) and the upper mode (e.g., candIntraPredModeB) and added to the index value 3, 4, 5 positions in the MPM candidate list.

If the MPM candidate list is constructed by the method shown in Table 4, the planar mode is positioned at the frontmost side in the MPM candidate list, thereby having top priority over other MPM candidates. Therefore, the planar mode may be preferentially constructed as the candidate intra prediction mode of the current block. Further, the signaling and the coding may be efficiently performed using a fewer number of bits.

Yet another exemplary embodiment may derive the intra prediction mode of the left neighbouring block (i.e., left mode) and the intra prediction mode of the upper neighbouring block (i.e., upper mode) based on the left neighbouring block and upper neighbouring block of the current block. Here, the left neighbouring block may indicate the left neighbouring block positioned at the lowermost portion of the left neighbouring blocks adjacent to the left of the current block, and the upper neighbouring block may indicate the upper neighbouring block positioned at the rightmost portion of the upper neighbouring blocks adjacent to the upper of the current block. For example, if the size of the current block is W×H, the x-component of the top-left sample position of the current block is xN, and the y-component thereof is yN, the left neighbouring block may be the block including the sample of the (xN−1, yN+H−1) coordinate, and the upper neighbouring block may be the block including the sample of the (xN+W−1, yN−1) coordinate.

At this time, if the left mode and the upper mode are the same intra prediction modes and both the left mode and the upper mode are the DC mode, the MPM candidate list may be generated as shown in Table 5 below.

TABLE 5

| | |
|---|---|
| Otherwise, the following applies: | |
| If IntraLumaRefLineIdx[ xCb ][ yCb ] is equal to 0, the following applies: | |
| candModeList[ 0 ] = INTRA_PLANAR | (8-54) |
| candModeList[ 1 ] = INTRA_DC | (8-55) |
| candModeList[ 2 ] = INTRA_ANGULAR50 | (8-56) |
| candModeList[ 3 ] = INTRA_ANGULAR18 | (8-57) |
| candModeList[ 4 ] = INTRA_ANGULAR46 | (8-58) |
| candModeList[ 5 ] = INTRA_ANGULAR54 | (8-59) |

The method shown in Table 5 constructs the planar mode to be first positioned in the MPM candidate list, and then adds the DC mode to the MPM candidate list.

For example, according to Table 5, if the intra prediction is performed using the zero reference line (e.g., a case where IntraLumaRefLineIdx=0) and if this is a case other than the aforementioned conditions shown in Tables 2 to 4, the MPM list may be constructed by deriving the MPM candidates as shown in Table 5. As an example, if the intra prediction is performed using the zero reference line (e.g., a case where IntraLumaRefLineIdx=0) and further, if the left mode and the upper mode are the same intra prediction modes and both the left mode and the upper mode are the DC mode, the planar mode (e.g., INTRA_PLANAR) may be inserted into the index value 0 position (e.g., candModeList[0]) in the MPM candidate list. Further, the DC mode (e.g., INTRA_DC) may be inserted into the index value 1 position (e.g., candModeList[1]) in the MPM candidate list. Thereafter, directionality intra prediction modes may be added to the index value 2, 3, 4, 5 positions in the MPM candidate list. For example, a directionality intra prediction mode 50 may be added to the index value 2 position (e.g., candModeList [2]) in the MPM candidate list, a directionality intra prediction mode 18 may be added to the index value 3 position (e.g., candModeList[3]) in the MPM candidate list, a directionality intra prediction mode 46 may be added to the index value 4 position (e.g., candModeList[4]) in the MPM candidate list, and a directionality intra prediction mode 54 may be added to the index value 5 position (e.g., candModeList [5]) in the MPM candidate list.

If the MPM candidate list is constructed by the method shown in Table 5, the planar mode is positioned at the frontmost portion in the MPM candidate list, thereby having top priority over other MPM candidates. Therefore, the planar mode may be preferentially constructed as the candidate intra prediction mode of the current block. Further, the signaling and the coding may be efficiently performed using a fewer number of bits.

As another embodiment, the intra prediction mode of the left neighbouring block (i.e., the left mode) and the intra prediction mode of the upper neighbouring block (i.e., the upper mode) may be derived based on the left neighbouring block and the upper neighbouring block of the current block. Here, the left neighbouring block may be a left neighbouring block located lowest among the left neighbouring blocks located adjacent to the left of the current block, while the upper neighbouring block may be an upper neighbouring block located rightmost among upper neighbouring blocks located adjacent to the upper side of the current block. For example, if the size of the current block is W×H, an x component of the top-left sample position of the current block is xN and a y component thereof is yN, then the left neighbouring block may be a block including a sample at coordinates (xN−1, yN+H−1), and the upper neighbouring block may be a block including a sample at coordinates (xN+W−1, yN−1).

In this case, when the left mode and the upper mode have intra prediction modes different from each other, and one intra prediction mode among the left mode and the upper mode is the planar mode or the DC mode, the MPM candidate list may be generated as shown in Table 6 below.

TABLE 6

| | |
|---|---|
| Otherwise (candIntraPredModeA or candIntraPredModeB is greater than INTRA_DC), candModeList[ x ] with x = 0..5 is derived as follows: | |
| If IntraLumaRefLineIdx[ xCb ][ yCb ] is equal to 0, the following applies: | |
| minAB = Min( candIntraPredModeA, candIntraPredModeB ) | |
| maxAB = Max( candIntraPredModeA, candIntraPredModeB ) | |
| candModeList[ 0 ] = minAB | (8-42) |
| candModeList[ 1 ] = maxAB | (8-43) |
| candModeList[ 2 ] = 1 − minAB | (8-44) |
| candModeList[ 3 ] = 2 + ( ( maxAB + 61 ) % 64 ) | (8-45) |
| candModeList[ 4 ] = 2 + ( ( maxAB − 1 ) % 64 ) | (8-46) |
| candModeList[ 5 ] = 2 + ( ( maxAB + 60 ) % 64 ) | (8-47) |

In the method of Table 6, it may be constructed such that an intra prediction mode having a smaller mode number among the left mode and the upper mode is located first in the MPM candidate list (e.g., mpm [0]), and then an intra prediction mode having a greater mode number among the left mode and the upper mode is located second in the MPM candidate list (e.g., mpm [1]). And, when the planar mode is inserted in the first position (e.g., mpm [0]) in the MPM candidate list, it may be constructed such that the DC mode is located in the third position in the MPM candidate list (e.g., mpm [2]), or when the DC mode is inserted in the first position (e.g., mpm [0]) in the MPM candidate list, it may be constructed such that the planar mode is located in the third position in the MPM candidate list (e.g., mpm [2]).

For example, according to Table 6, when intra prediction is performed using the 0th reference line (e.g., IntraLumaRefLineIdx=0), and the left mode (e.g., candIntraPredModeA) and the upper mode (e.g., candIntraPredModeB) are not the same and any one of the two modes is the planar mode or the DC mode, then an intra prediction mode (e.g., minAB) of a smaller mode number among the left mode (e.g., candIntraPredModeA) and the upper mode (e.g., candIntraPredModeB) may be inserted at the index value 0 position (e.g., candModeList[0]) in the MPM candidate list. And, in the index value 1 position (e.g., candModeList[1]) in the MPM candidate list, the intra prediction mode (e.g., maxAB) of a greater mode number among the left mode (e.g., candIntraPredModeA) and the upper mode (e.g., candIntraPredModeB) may be inserted. At this time, if any one of the left mode (e.g., candIntraPredModeA) and the upper mode (e.g., candIntraPredModeB) is the planar mode, the DC mode may be added to the index value 2 position (e.g., candModeList [2]) in the MPM candidate list. Contrarily, if any one of the left mode (e.g., candIntraPredModeA) and the upper mode (e.g., candIntraPredModeB) is the DC mode, the planar mode may be added to the index value 2 position (e.g., candModeList[2]) in the MPM candidate list. Thereafter, the rest of the MPM candidates may be derived through a specific operation based on the greater mode number of the left mode (e.g. candIntraPredModeA) and the upper mode (e.g. candIntraPredModeB), and added to the index values 3, 4, and 5 positions in the MPM candidate list.

When constructing the MPM candidate list in the manner shown in Table 6, since the planar mode or the DC mode is located foremost in the MPM candidate list, it may have priority over the other MPM candidates. Accordingly, the planar mode or the DC mode may be preferentially constructed as the candidate intra prediction mode of the current block. In addition, by deriving the candidate intra prediction modes and constructing the MPM list in this way, signaling and coding can be efficiently performed with fewer bits.

As another embodiment, the intra prediction mode of the left neighbouring block (i.e., the left mode) and the intra prediction mode of the upper neighbouring block (i.e., the upper mode) may be derived based on the left neighbouring block and the upper neighbouring block of the current block. Here, the left neighbouring block may be a left neighbouring block located lowest among the left neighbouring blocks located adjacent to the left of the current block, while the upper neighbouring block may be an upper neighbouring block located rightmost among upper neighbouring blocks located adjacent to the upper side of the current block. For example, if the size of the current block is W×H, an x component of the top-left sample position of the current block is xN and a y component thereof is yN, then the left neighbouring block may be a block including a sample at coordinates (xN−1, yN+H−1), and the upper neighbouring block may be a block including a sample at coordinates (xN+W−1, yN−1).

In this case, when the left mode and the upper mode have intra prediction modes different from each other, and the left mode and the upper mode are the planar mode and the DC mode, respectively, an MPM candidate list may be generated as shown in Table 7 below.

TABLE 7

| | |
|---|---|
| Otherwise (candIntraPredModeA and candIntraPredModeB is smaller than INTRA_ANGULAR2), candModeList[ x ] with x = 0..5 is derived as follows: | |
| If IntraLumaRefLineIdx[ xCb ][ yCb ] is equal to 0, the following applies: | |
| candModeList[ 0 ] = INTRA_PLANAR | (8-42) |
| candModeList[ 1 ] = INTRA_DC | (8-43) |
| candModeList[ 2 ] = INTRA_VER | (8-44) |
| candModeList[ 3 ] = INTRA_HOR | (8-45) |
| candModeList[ 4 ] = INTRA_VER − 4 | (8-46) |
| candModeList[ 5 ] = INTRA_VER + 4 | (8-47) |

In the method of Table 7, it is constructed such that the planar mode is located first in the MPM candidate list, and then the DC mode is added to the MPM candidate list.

For example, according to Table 7, when intra prediction is performed using the 0th reference line (e.g., IntraLumaRefLineIdx=0), and the left mode (e.g., candIntraPredModeA) and the upper mode (e.g., candIntraPredModeB) are not the same and the two modes have a mode number smaller than intra prediction mode 2 (e.g., INTRA_ANGULAR2) (that is, if the left mode and the upper mode are planar mode and DC mode, respectively), the planar mode (e.g., INTRA_PLANAR) may be inserted at the index value 0 position (e.g., candModeList[0]) in the MPM candidate list. And, the DC mode (e.g., INTRA_DC) may be inserted at the index value 1 position (e.g., candModeList[1]) in the MPM candidate list. Thereafter, directional intra prediction modes may be added at index values 2, 3, 4, and 5 positions in the MPM candidate list. For example, intra prediction mode 50 (e.g., INTRA_VER), which is an intra prediction mode in the vertical direction, may be added to the index value 2 position (e.g., candModeList[2]) in the MPM candidate list; intra prediction mode 18 (e.g., INTRA_HOR), which is an intra prediction mode in the horizontal direction, may be added to the index value 3 position (e.g., candModeList[3]) in the MPM candidate list; intra prediction mode 46 having a mode number of (intra prediction mode in the vertical direction −4) may be added to the index value 4 position (e.g., candModeList[4]) in the MPM candidate list; and intra prediction mode 54 having a mode number of (intra prediction mode in the vertical direction+4) may be added to the index value 5 position (e.g., candModeList[5]) in the MPM candidate list.

When constructing the MPM candidate list in the manner shown in Table 7, since the planar mode is located foremost in the MPM candidate list, it may have the highest priority over the other MPM candidates. Accordingly, the planar mode may be preferentially constructed as the candidate intra prediction mode of the current block. In addition, by deriving the candidate intra prediction modes and constructing the MPM list in this way, signaling and coding can be efficiently performed with fewer bits.

As another embodiment, the embodiments described above with reference to Tables 2 to 7 may be combined and used in various ways. For example, any of the two methods of Tables 2 and 3 may be used in combination with the method of Table 4, or the method of Table 4 may be used in combination with the method of Table 5. Alternatively, it is possible to use the embodiments of Tables 2 to 7 by combining them variously in a combinable way, and it is also possible to use one method selected from among the embodiments of Tables 2 to 7 by arbitrarily combining it with one or more of the other embodiments.

Figure 12:
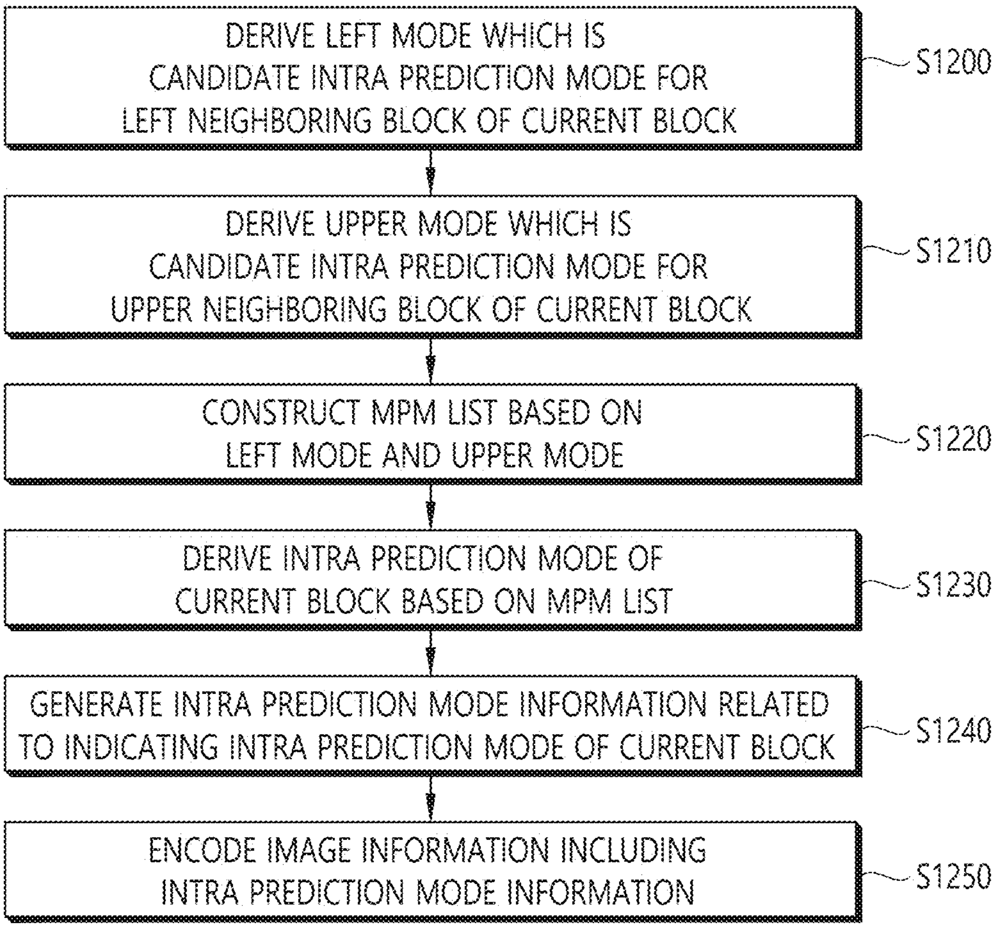
FIG. 12 is a flowchart schematically illustrating an encoding method which may be performed by an encoding apparatus according to an embodiment of this document.

FIG. 12 is a flowchart schematically illustrating an encoding method which may be performed by an encoding apparatus according to an embodiment of this document.

The method disclosed in FIG. 12 may be performed by the encoding apparatus 200 disclosed in FIG. 2. Specifically, steps S1200 to S1240 of FIG. 12 may be performed by the predictor 220 and the intra predictor 222 disclosed in FIG. 2, and steps S1240 to S1250 of FIG. 12 may be performed by the entropy encoder 240 disclosed in FIG. 2. In addition, the method disclosed in FIG. 12 may include the embodiments described above in this document. Accordingly, in FIG. 12, a detailed description of contents corresponding to the repetition of the above-described embodiments will be omitted or simplified.

Referring to FIG. 12, the encoding apparatus derives a left mode which is a candidate intra prediction mode for a left neighbouring block of the current block (S1200), and derive an upper mode which is a candidate intra prediction mode for an upper neighbouring block of the current block (S1210).

Here, the left neighbouring block may be a neighbouring block located lowest among the left neighbouring blocks located adjacent to the left of the current block, while the upper neighbouring block may be a neighbouring block located rightmost among upper neighbouring blocks located adjacent to the upper side of the current block. For example, if the size of the current block is W×H, an x component of the top-left sample position of the current block is xN and a y component thereof is yN, then the left neighbouring block may be a block including a sample at coordinates (xN−1, yN+H−1), and the upper neighbouring block may be a block including a sample at coordinates (xN+W−1, yN−1).

In one embodiment, when the left neighbouring block is available and intra prediction is applied to the left neighbouring block, the encoding apparatus may derive the intra prediction mode of the left neighbouring block as the left candidate intra prediction mode (i.e., the left mode). When the upper neighbouring block is available, intra prediction is applied to the upper neighbouring block, and the upper neighbouring block is included in a current CTU, then the encoding apparatus may derive the intra prediction mode of the upper neighbouring block as the upper candidate intra prediction mode (i.e., upper mode). Alternatively, when the left neighbouring block is not available or intra prediction is not applied to the left neighbouring block, the encoding apparatus may derive the planar mode as the left mode. When the upper neighbouring block is not available, or intra prediction is not applied to the upper neighbouring block, or the upper neighbouring block is not included in the current CTU, the encoding apparatus may derive the planar mode as the upper mode.

The encoding apparatus may construct a Most Probable Mode (MPM) list based on the left mode and the upper mode (S1220).

That is, the encoding apparatus may construct the MPM list by deriving candidate intra prediction modes for the current block based on the left mode derived from the left neighbouring block and the upper mode derived from the upper neighbouring block. In this case, the process of constructing the MPM list may be subjected to the application of the various embodiments described above, which have been described in detail with reference to Tables 1 to 7 above.

As an embodiment, the encoding apparatus may confirm whether or not the planar mode is preferentially derived as a candidate intra prediction mode of the current block rather than the candidate intra prediction modes in the MPM list, based on whether or not 0th reference sample line for intra prediction is used for the current block. Here, the 0th reference sample line may include a left reference sample line located first closest to a left boundary of the current block, and an upper reference sample line located first closest to an upper boundary of the current block. When the 0th reference sample line is used for intra prediction of the current block, the encoding apparatus may generate the MPM list by imposing a condition of preferentially confirming the planar mode rather than other candidate intra prediction modes in the MPM list generation condition. For example, when the 0th reference sample line is used for intra prediction of the current block, the encoding apparatus may preferentially derive the planar mode as the candidate intra prediction mode of the current block rather than other candidate intra prediction modes included in the MPM list.

Alternatively, as an embodiment, the encoding apparatus may construct an MPM list by deriving candidate intra prediction modes under a specific condition (i.e. depending on whether or not specific conditions are satisfied), based on the candidate intra prediction mode of the left neighbouring block (i.e., left mode) and the candidate intra prediction mode of the upper neighbouring block (i.e., upper mode) while intra prediction is performed using the 0th reference sample line for the current block.

For example, when the left mode and the upper mode are not identical to each other, and the left mode and the upper mode are the planar mode and the DC mode, respectively, the encoding apparatus may derive the left mode or the upper mode as one of the candidate intra prediction modes in the MPM list. In this case, when the left mode is the DC mode and the upper mode is the planar mode, the encoding apparatus may derive the left mode as one of the candidate intra prediction modes in the MPM list. Alternatively, when the left mode is the planar mode and the upper mode is the DC mode, the encoding apparatus may derive the upper mode as one of the candidate intra prediction modes in the MPM list. Also, in this case, the encoding apparatus may further derive the directional intra prediction modes as candidate intra prediction modes of the MPM list. For example, the directional intra prediction modes may include the vertical intra prediction mode in the vertical direction (i.e., intra prediction mode 50), the horizontal intra prediction mode in the horizontal direction (i.e., intra prediction mode 18), the intra prediction mode having a mode number of (mode number of vertical intra prediction mode −4) (i.e., intra prediction mode 46), and the intra prediction mode having a mode number of (mode number of vertical intra prediction mode +4) (i.e., intra prediction mode 54). Also, in this case, the encoding apparatus may confirm whether or not the planar mode is a candidate intra prediction mode of the current block preferentially over the candidate intra prediction modes, and may derive it as the candidate intra prediction mode of the current block.

In other words, when the left mode and the upper mode are not the same, and the left mode and the upper mode are the planar mode and the DC mode, respectively, the encoding apparatus may derive the DC mode, the vertical intra prediction mode (i.e., intra prediction mode 50), the horizontal intra prediction mode (i.e., intra prediction mode 18), the intra prediction mode having a mode number of (mode number of vertical intra prediction mode −4) (i.e., intra prediction mode 46), and the intra prediction mode having a mode number of (mode number of vertical intra prediction mode +4) (i.e., intra prediction mode 54) as candidate intra prediction modes, and construct the MPM list with them. In this case, the candidate intra prediction modes of the MPM list may be represented by index values. As an example, the DC mode may be represented by a first index value in the MPM list; the vertical intra prediction mode may be represented by a second index value in the MPM list; the horizontal intra prediction mode may be represented by a third index value in the MPM list; the intra prediction mode having a mode number of (mode number of the vertical intra prediction mode −4) may be represented by a fourth index value in the MPM list; and the intra prediction mode having a mode number of (mode number of the vertical intra prediction mode +4) may be represented by a fifth index value in the MPM list. Further, in this case, the encoding apparatus may confirm whether or not the planar mode is preferentially derived as the candidate intra prediction mode of the current block rather than the above candidate intra prediction modes (i.e., the DC mode, the vertical intra prediction mode, the horizontal intra prediction mode, the intra prediction mode having a mode number of (mode number of the vertical intra prediction mode −4), and the intra prediction mode having a mode number of (mode number of the vertical intra prediction mode +4)), based on whether or not the 0th reference sample line for intra prediction is used for the current block.

As another example, when the left mode and the upper mode are not identical to each other, and any one of the left mode and the upper mode is the planar mode or the DC mode, the encoding apparatus may derive the left mode and the upper mode as the candidate intra prediction modes in the MPM list. In this case, when any one of the left mode and the upper mode is the planar mode, the encoding apparatus may further derive the DC mode as the candidate intra prediction modes in the MPM list. Alternatively, when any one of the left mode and the upper mode is the DC mode, the encoding apparatus may further derive the planar mode as the candidate intra prediction modes in the MPM list. Additionally, the encoding apparatus may represent the candidate intra prediction modes in the MPM list as index values. In an embodiment, a candidate intra prediction mode having a smaller mode number among the left mode and the upper mode may be represented by a first index value in the MPM list, and a candidate intra prediction mode having a greater mode number among the left mode and the upper mode may be represented by a second index value in the MPM list. And, depending on which one of the left mode and the upper mode is the planar mode or the DC mode, the additionally derived candidate intra prediction mode may also be represented as an index value in the MPM list. As described above, when any one of the left mode and the upper mode is the planar mode, the DC mode may be derived as the candidate intra prediction mode in the MPM list, and in this case, the DC mode may be represented by the third index value in the MPM list. Alternatively, when any one of the left mode and the upper mode is the DC mode, the planar mode may be derived as the candidate intra prediction mode in the MPM list, and in this case, the planar mode may be represented by the third index value in the MPM list. Additionally, in this case, the encoding apparatus may further derive the rest of the candidate intra prediction modes through a specific operation based on a greater mode number among the left mode and the upper mode, and may represent them as the index values in the MPM candidate list. For example, the rest of candidate intra prediction modes may be further derived as described in Table 6 above.

As another example, when the left mode and the upper mode are the same, but both the left mode and the upper mode are DC modes, the encoding apparatus may derive candidate intra prediction modes, including the DC mode. Also, the encoding apparatus may derive candidate intra prediction modes further including directional intra prediction modes. In this case, the directional intra prediction modes may be added after the DC mode in the MPM list. For example, the directional intra prediction modes may include intra prediction mode 50 (i.e., vertical intra prediction mode), intra prediction mode 18 (i.e., horizontal intra prediction mode), intra prediction mode 46 (i.e., horizontal diagonal intra prediction mode), and intra prediction mode 54 (i.e., vertical diagonal intra prediction mode). Also, in this case, the encoding apparatus may confirm whether or not the planar mode is a candidate intra prediction mode of the current block preferentially over the candidate intra prediction modes, and may derive it as the candidate intra prediction mode of the current block.

In other words, when the left mode and the upper mode are the same, but both the left mode and the upper mode are DC mode, the encoding apparatus may derive DC mode, intra prediction mode 50, intra prediction mode 18, intra prediction mode 46, and intra prediction mode 54 as candidate intra prediction modes, and construct the MPM list with them. In this case, the encoding apparatus may allocate a first index to the DC mode, allocate a second index to intra prediction mode 50, allocate a third index to intra prediction mode 18, allocate a fourth index to intra prediction mode 46, and allocate a fifth index to the intra prediction mode 54, in the MPM list. Further, in this case, the encoding apparatus may confirm whether or not the planar mode is preferentially derived as the candidate intra prediction mode of the current block rather than the candidate intra prediction modes (i.e., DC mode, intra prediction mode 50, intra prediction mode 18, intra prediction mode 46, intra prediction mode 54), based on whether or not the 0th reference sample line for intra prediction is used for the current block.

In another example, when the left mode and the upper mode are not the same, and the left mode and the upper mode both have a mode number greater than the DC mode, the encoding apparatus may derive candidate intra prediction modes including the left mode and the upper mode. In addition, the encoding apparatus may derive candidate intra prediction modes further including a DC mode. In this case, the DC mode may be added after the left mode and the upper mode in the MPM list. Additionally, in this case, the encoding apparatus may construct the MPM list by confirming whether or not the planar mode can be derived as a candidate intra prediction mode of the current block preferentially over the candidate intra prediction modes (i.e., the left mode, the upper mode, and the DC mode). Also, in this case, the encoding apparatus may further derive the rest of candidate intra prediction modes based on the difference value of the mode number between the left mode and the upper mode, for example, further derive the rest of candidate intra prediction modes as described in Table 3 above.

In another example, when the left mode and the upper mode are not the same, and the left mode and the upper mode both have a mode number greater than the DC mode, the encoding apparatus may derive candidate intra prediction modes including the left mode and the upper mode. In addition, the encoding apparatus may derive candidate intra prediction modes further including a DC mode. In this case, the DC mode may be added after the left mode and the upper mode in the MPM list. Further, in this case, the encoding apparatus may constructing the MPM list by confirming whether or not the planar mode can be derived as a candidate intra prediction mode of the current block preferentially over any one of the left mode and the upper mode. Also, in this case, the encoding apparatus may further derive the rest of candidate intra prediction modes based on the difference value of the mode number between the left mode and the upper mode, for example, further derive the rest of candidate intra prediction modes as described in Table 2 above.

In another example, when the left mode and the upper mode are not the same, and any one of the left mode or the upper mode is the planar mode, the encoding apparatus may construct the MPM list by confirming whether or not a candidate intra prediction mode that is a planar mode among the left mode or the upper mode can be preferentially derived as a candidate intra prediction mode of the current block. That is, in this case, the encoding apparatus first derives the planar mode as the candidate intra prediction mode, and then may derive an intra prediction mode other than the planar mode among the left mode or the upper mode as the candidate intra prediction mode. In addition, the DC mode may be further derived as a candidate intra prediction mode, and then, the rest of candidate intra prediction modes may be derived through a specific operation based on a greater mode number of the left mode or the upper mode. The derived candidate intra prediction modes may be sequentially included in the MPM list. For example, the rest of candidate intra prediction modes may be further derived as described in Table 4 above.

The encoding apparatus may derive the intra prediction mode of the current block based on the MPM list (S1230), and generate intra prediction mode information for indicating the intra prediction mode of the current block (S1240).

In one embodiment, the encoding apparatus may perform various intra prediction modes on the current block, derive an intra prediction mode having an optimal rate-distortion (RD) cost, and determine it as the intra prediction mode of the current block. In this case, the encoding apparatus may derive an optimal intra prediction mode for the current block based on intra prediction modes including two non-directional intra prediction modes and 65 intra directional prediction modes.

Then, the encoding apparatus may determine whether or not the optimal intra prediction mode derived for the current block is one of the candidate intra prediction modes in the MPM list, and may generate intra prediction mode information for the current block according to the determination result. For example, when the intra prediction mode for the current block is included among the candidate intra prediction modes in the MPM list, the encoding apparatus may generate intra prediction mode information (e.g., MPM index information) for indicating an intra prediction mode for a current block among candidate intra prediction modes in the MPM list. Alternatively, when the intra prediction mode for the current block is not included among the candidate intra prediction modes in the MPM list, the encoding apparatus may generate remaining mode information for indicating the intra prediction mode for the current block among the rest of intra prediction modes except for the candidate intra prediction modes in the MPM list.

The encoding apparatus may generate MPM flag information based on whether or not the optimal intra prediction mode derived for the current block is one of the candidate intra prediction modes in the MPM list. For example, when the intra prediction mode for the current block is included among the candidate intra prediction modes in the MPM list, the encoding apparatus may generate MPM flag information as 1. Alternatively, when the intra prediction mode for the current block is not included among the candidate intra prediction modes in the MPM list, the encoding apparatus may generate MPM flag information as 0.

The encoding apparatus may encode image information including intra prediction mode information (S1250).

In one embodiment, the encoding apparatus encodes image information including intra prediction mode information (e.g., MPM index information, remanding mode information, MPM flag information, etc.) of the current block derived based on the MPM list as described above.

Also, the encoding apparatus may generate prediction samples of the current block based on the intra prediction mode of the current block. In an embodiment, the encoding apparatus may derive at least one neighbouring reference sample from among neighbouring reference samples of the current block based on the intra prediction mode, and may generate prediction samples based on the neighbouring reference sample. Here, the neighbouring reference samples may include an upper-left corner neighbouring sample, upper neighbouring samples and left neighbouring samples of the current block. For example, when a size of the current block is W×H, and an x component of a top-left sample position of the current block is xN and a y component thereof is yN, then the left neighbouring samples may be p[xN−1][yN] to p[xN−1][2H+yN−1], the upper-left corner neighbouring sample may be p[xN−1][yN−1], and the upper neighbouring samples may be p[xN][yN−1] to p[2 W+xN−1][yN−1].

Also, the encoding apparatus may derive residual samples for the current block based on the prediction samples of the current block and the original samples of the current block. In addition, the encoding apparatus may generate residual information on the current block based on the residual samples, and encode image information including the residual information. Here, the residual information may include information such as value information of quantized transform coefficients derived by performing transform and quantization on the residual samples, location information, a transform technique, a transform kernel, a quantization parameter and the like.

That is, the encoding apparatus may encode image information including the intra prediction mode information and/or residual information of the above-described current block, and output the encoded image information in a bitstream.

The bitstream may be transmitted to the decoding apparatus through a network or a (digital) storage medium. Here, the network may include a broadcast network, a communication network and/or the like, and the digital storage medium may include various storage media, such as USB, SD, CD, DVD, Blu-ray, HDD, SSD, and the like.

The above-described process of generating prediction samples for the current block may be performed by the intra predictor 222 of the encoding apparatus 200 disclosed in FIG. 2; the process of deriving residual samples may be performed by the subtractor 231 of the encoding apparatus 200 disclosed in FIG. 2; and the process of generating and encoding the residual information may be performed by the residual processor 230 and the entropy encoder 240 of the encoding apparatus 200 disclosed in FIG. 2.

Figure 13:
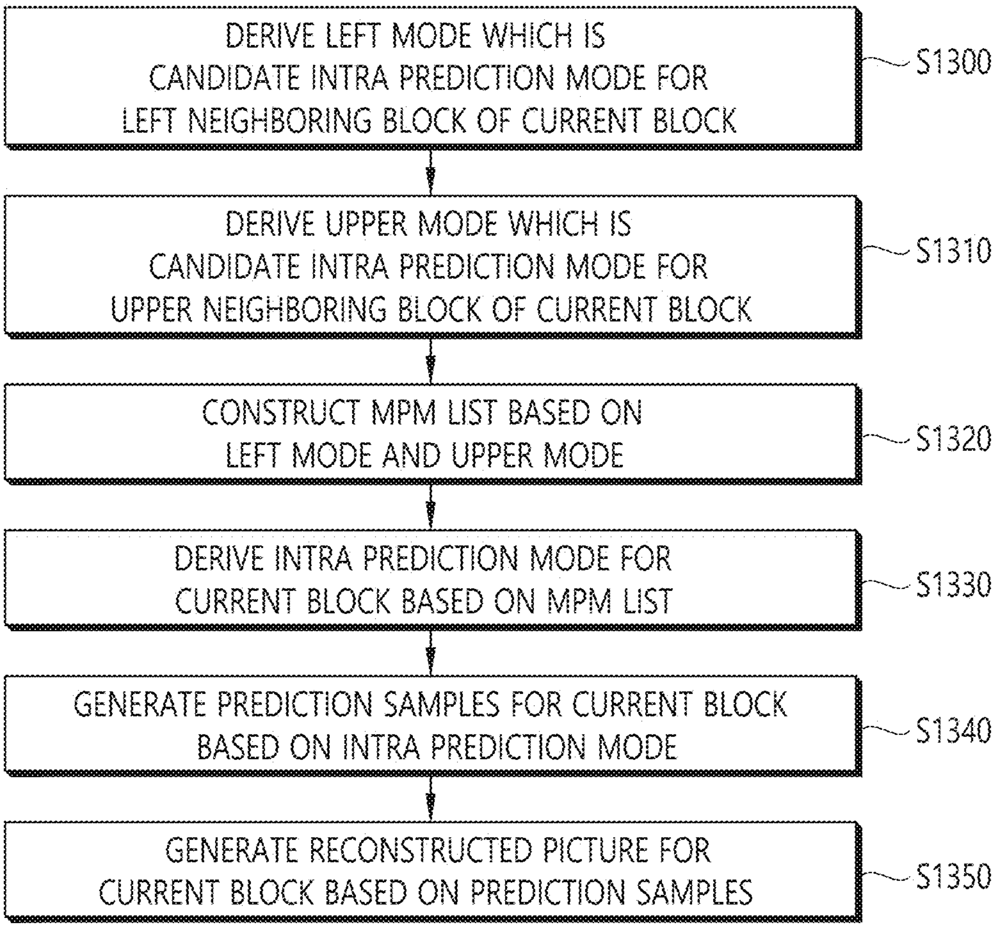
FIG. 13 is a flowchart schematically illustrating a decoding method which may be performed by a decoding apparatus according to an embodiment of this document.

FIG. 13 is a flowchart schematically illustrating a decoding method which may be performed by a decoding apparatus according to an embodiment of this document.

The method disclosed in FIG. 13 may be performed by the decoding apparatus 300 disclosed in FIG. 3. Specifically, steps S1300 to S1340 of FIG. 13 may be performed by the predictor 330 and the intra predictor 331 shown in FIG. 3, and step S1350 of FIG. 13 may be performed by the residual processor 320 and/or the adder 340 disclosed in FIG. 3. In addition, the method disclosed in FIG. 13 may include the embodiments described above in this document. Accordingly, in FIG. 13, a detailed description of contents corresponding to the repetition of the above-described embodiments will be omitted or simplified.

Referring to FIG. 13, the decoding apparatus derives a left mode which is a candidate intra prediction mode for a left neighbouring block of the current block (S1300), and derive an upper mode which is a candidate intra prediction mode for an upper neighbouring block of the current block (S1310).

Here, the left neighbouring block may be a neighbouring block located lowest among the left neighbouring blocks located adjacent to the left of the current block, while the upper neighbouring block may be a neighbouring block located rightmost among upper neighbouring blocks located adjacent to the upper side of the current block. For example, if the size of the current block is W×H, an x component of the top-left sample position of the current block is xN and a y component thereof is yN, then the left neighbouring block may be a block including a sample at coordinates (xN−1, yN+H−1), and the upper neighbouring block may be a block including a sample at coordinates (xN+W−1, yN−1).

In one embodiment, when the left neighbouring block is available and intra prediction is applied to the left neighbouring block, the decoding apparatus may derive the intra prediction mode of the left neighbouring block as the left candidate intra prediction mode (i.e., the left mode). When the upper neighbouring block is available, intra prediction is applied to the upper neighbouring block, and the upper neighbouring block is included in a current CTU, then the decoding apparatus may derive the intra prediction mode of the upper neighbouring block as the upper candidate intra prediction mode (i.e., upper mode). Alternatively, when the left neighbouring block is not available or intra prediction is not applied to the left neighbouring block, the decoding apparatus may derive the planar mode as the left mode. When the upper neighbouring block is not available, or intra prediction is not applied to the upper neighbouring block, or the upper neighbouring block is not included in the current CTU, the decoding apparatus may derive the planar mode as the upper mode.

The decoding apparatus may construct a Most Probable Mode (MPM) list based on the left mode and the upper mode (S1320).

That is, the decoding apparatus may construct the MPM list by deriving candidate intra prediction modes for the current block based on the left mode derived from the left neighbouring block and the upper mode derived from the upper neighbouring block. In this case, the process of constructing the MPM list may be applied to the various embodiments described above, which have been described in detail with reference to Tables 1 to 7 above.

In an embodiment, the decoding apparatus may confirm whether or not the planar mode is preferentially derived as a candidate intra prediction mode of the current block rather than the candidate intra prediction modes in the MPM list, based on whether or not 0th reference sample line for intra prediction is used for the current block. Here, the 0th reference sample line may include a left reference sample line located first closest to a left boundary of the current block, and an upper reference sample line located first closest to an upper boundary of the current block. When the 0th reference sample line is used for intra prediction of the current block, the decoding apparatus may generate the MPM list by imposing a condition of preferentially confirming the planar mode rather than other candidate intra prediction modes in the MPM list generation condition. For example, when the 0th reference sample line is used for intra prediction of the current block, the decoding apparatus may preferentially derive the planar mode as the candidate intra prediction mode of the current block rather than other candidate intra prediction modes included in the MPM list.

Alternatively, as an embodiment, the decoding apparatus may construct an MPM list by deriving candidate intra prediction modes under a specific condition (i.e. depending on whether or not certain conditions are satisfied), based on the candidate intra prediction mode of the left neighbouring block (i.e., left mode) and the candidate intra prediction mode of the upper neighbouring block (i.e., upper mode) while intra prediction is performed using the 0th reference sample line for the current block.

For example, when the left mode and the upper mode are not identical to each other, and the left mode and the upper mode are the planar mode and the DC mode, respectively, the decoding apparatus may derive the left mode or the upper mode as one of the candidate intra prediction modes in the MPM list. In this case, when the left mode is the DC mode and the upper mode is the planar mode, the decoding apparatus may derive the left mode as one of the candidate intra prediction modes in the MPM list. Alternatively, when the left mode is the planar mode and the upper mode is the DC mode, the decoding apparatus may derive the upper mode as one of the candidate intra prediction modes in the MPM list. Also, in this case, the decoding apparatus may further derive the directional intra prediction modes as candidate intra prediction modes of the MPM list. For example, the directional intra prediction modes may include the vertical intra prediction mode in the vertical direction (i.e., intra prediction mode 50), the horizontal intra prediction mode in the horizontal direction (i.e., intra prediction mode 18), the intra prediction mode having a mode number of (mode number of vertical intra prediction mode −4) (i.e., intra prediction mode 46), and the intra prediction mode having a mode number of (mode number of vertical intra prediction mode +4) (i.e., intra prediction mode 54). Also, in this case, the decoding apparatus may confirm whether or not the planar mode is a candidate intra prediction mode of the current block preferentially over the candidate intra prediction modes, and may derive it as the candidate intra prediction mode of the current block.

In other words, when the left mode and the upper mode are not the same, and the left mode and the upper mode are the planar mode and the DC mode, respectively, the decoding apparatus may derive the DC mode, the vertical intra prediction mode (i.e., intra prediction mode 50), the horizontal intra prediction mode (i.e., intra prediction mode 18), the intra prediction mode having a mode number of (mode number of vertical intra prediction mode-4) (i.e., intra prediction mode 46), and the intra prediction mode having a mode number of (mode number of vertical intra prediction mode +4) (i.e., intra prediction mode 54) as candidate intra prediction modes, and construct the MPM list with them. In this case, the candidate intra prediction modes of the MPM list may be represented by index values. As an example, the DC mode may be represented by a first index value in the MPM list; the vertical intra prediction mode may be represented by a second index value in the MPM list; the horizontal intra prediction mode may be represented by a third index value in the MPM list; the intra prediction mode having a mode number of (mode number of the vertical intra prediction mode −4) may be represented by a fourth index value in the MPM list; and the intra prediction mode having a mode number of (mode number of the vertical intra prediction mode +4) may be represented by a fifth index value in the MPM list. Further, in this case, the decoding apparatus may confirm whether or not the planar mode is preferentially derived as the candidate intra prediction mode of the current block rather than the above candidate intra prediction modes (i.e., the DC mode, the vertical intra prediction mode, the horizontal intra prediction mode, the intra prediction mode having a mode number of (mode number of the vertical intra prediction mode −4), and the intra prediction mode having a mode number of (mode number of the vertical intra prediction mode +4)), based on whether or not the 0th reference sample line for intra prediction is used for the current block.

As another example, when the left mode and the upper mode are not identical to each other, and any one of the left mode and the upper mode is the planar mode or the DC mode, the decoding apparatus may derive the left mode and the upper mode as the candidate intra prediction modes in the MPM list. In this case, when any one of the left mode and the upper mode is the planar mode, the decoding apparatus may further derive the DC mode as the candidate intra prediction modes in the MPM list. Alternatively, when any one of the left mode and the upper mode is the DC mode, the decoding apparatus may further derive the planar mode as the candidate intra prediction modes in the MPM list. Additionally, the decoding apparatus may represent the candidate intra prediction modes in the MPM list as index values. In an embodiment, a candidate intra prediction mode having a smaller mode number among the left mode and the upper mode may be represented by a first index value in the MPM list, and a candidate intra prediction mode having a greater mode number among the left mode and the upper mode may be represented by a second index value in the MPM list. And, depending on which one of the left mode and the upper mode is the planar mode or the DC mode, the additionally derived candidate intra prediction mode may also be represented as an index value in the MPM list. As described above, when any one of the left mode and the upper mode is the planar mode, the DC mode may be derived as the candidate intra prediction mode in the MPM list, and in this case, the DC mode may be represented by the third index value in the MPM list. Alternatively, when any one of the left mode and the upper mode is the DC mode, the planar mode may be derived as the candidate intra prediction mode in the MPM list, and in this case, the planar mode may be represented by the third index value in the MPM list. Additionally, in this case, the decoding apparatus may further derive the rest of the candidate intra prediction modes through a specific operation based on a greater mode number among the left mode and the upper mode, and may represent them as the index values in the MPM candidate list. For example, the rest of candidate intra prediction modes may be further derived as described in Table 6 above.

As another example, when the left mode and the upper mode are the same, but both the left mode and the upper mode are DC modes, the decoding apparatus may derive candidate intra prediction modes, including the DC mode. Also, the decoding apparatus may derive candidate intra prediction modes further including directional intra prediction modes. In this case, the directional intra prediction modes may be added after the DC mode in the MPM list. For example, the directional intra prediction modes may include intra prediction mode 50 (i.e., vertical intra prediction mode), intra prediction mode 18 (i.e., horizontal intra prediction mode), intra prediction mode 46 (i.e., horizontal diagonal intra prediction mode), and intra prediction mode 54 (i.e., vertical diagonal intra prediction mode). Also, in this case, the decoding apparatus may confirm whether or not the planar mode is a candidate intra prediction mode of the current block preferentially over the candidate intra prediction modes, and may derive it as the candidate intra prediction mode of the current block.

In other words, when the left mode and the upper mode are the same, but both the left mode and the upper mode are DC mode, the decoding apparatus may derive DC mode, intra prediction mode 50, intra prediction mode 18, intra prediction mode 46, and intra prediction mode 54 as candidate intra prediction modes, and construct the MPM list with them. In this case, the decoding apparatus may allocate a first index to the DC mode, allocate a second index to intra prediction mode 50, allocate a third index to intra prediction mode 18, allocate a fourth index to intra prediction mode 46, and allocate a fifth index to the intra prediction mode 54, in the MPM list. Further, in this case, the decoding apparatus may confirm whether or not the planar mode is preferentially derived as the candidate intra prediction mode of the current block rather than the candidate intra prediction modes (i.e., DC mode, intra prediction mode 50, intra prediction mode 18, intra prediction mode 46, intra prediction mode 54), based on whether or not the 0th reference sample line for intra prediction is used for the current block.

In another example, when the left mode and the upper mode are not the same, and the left mode and the upper mode both have a mode number greater than the DC mode, the decoding apparatus may derive candidate intra prediction modes including the left mode and the upper mode. In addition, the decoding apparatus may derive candidate intra prediction modes further including a DC mode. In this case, the DC mode may be added after the left mode and the upper mode in the MPM list. Additionally, in this case, the decoding apparatus may construct the MPM list by confirming whether or not the planar mode can be derived as a candidate intra prediction mode of the current block preferentially over the candidate intra prediction modes (i.e., the left mode, the upper mode, and the DC mode). Also, in this case, the decoding apparatus may further derive the rest of candidate intra prediction modes based on the difference value of the mode number between the left mode and the upper mode, for example, further derive the rest of candidate intra prediction modes as described in Table 3 above.

In another example, when the left mode and the upper mode are not the same, and the left mode and the upper mode both have a mode number greater than the DC mode, the decoding apparatus may derive candidate intra prediction modes including the left mode and the upper mode. In addition, the decoding apparatus may derive candidate intra prediction modes further including a DC mode. In this case, the DC mode may be added after the left mode and the upper mode in the MPM list. Further, in this case, the decoding apparatus may constructing the MPM list by confirming whether or not the planar mode can be derived as a candidate intra prediction mode of the current block preferentially over any one of the left mode and the upper mode. Also, in this case, the decoding apparatus may further derive the rest of candidate intra prediction modes based on the difference value of the mode number between the left mode and the upper mode, for example, further derive the rest of candidate intra prediction modes as described in Table 2 above.

In another example, when the left mode and the upper mode are not the same, and any one of the left mode or the upper mode is the planar mode, the decoding apparatus may construct the MPM list by confirming whether or not a candidate intra prediction mode that is a planar mode among the left mode or the upper mode can be preferentially derived as a candidate intra prediction mode of the current block. That is, in this case, the decoding apparatus first derives the planar mode as the candidate intra prediction mode, and then may derive an intra prediction mode other than the planar mode among the left mode or the upper mode as the candidate intra prediction mode. In addition, the DC mode may be further derived as a candidate intra prediction mode, and then, the rest of candidate intra prediction modes may be derived through a specific operation based on a greater mode number of the left mode or the upper mode. The derived candidate intra prediction modes may be sequentially included in the MPM list. For example, the rest of candidate intra prediction modes may be further derived as described in Table 4 above.

The decoding apparatus may derive an intra prediction mode for the current block based on the MPM list (S1330).

In an embodiment, the decoding apparatus may obtain intra prediction mode information for the current block from the bitstream. The intra prediction mode information may be information for indicating the intra prediction mode of the current block, and may include MPM flag information, MPM index information, remaining mode information, and the like.

The decoding apparatus may obtain MPM flag information for indicating whether or not an intra prediction mode for a current block is included among candidate intra prediction modes in the MPM list. In addition, the decoding apparatus may obtain MPM index information or remaining mode information based on the MPM flag information. Here, the MPM flag information may be signaled in the form of an intra_luma_mpm_flag syntax element. MPM index information may be signaled in the form of an mpm_idx or intra_luma_mpm_idx syntax element. The remaining mode information may be signaled in the form of a rem_intra_luma_pred_mode or intra_luma_mpm_remainder syntax element.

For example, when the intra prediction mode for the current block is included among the candidate intra prediction modes in the MPM list (i.e., when the MPM flag information indicates 1), the decoding apparatus may obtain MPM index information for indicating the intra prediction mode for the current block from among the candidate intra prediction modes in the MPM list, and may derive the candidate intra prediction mode indicated by the MPM index information in the MPM list as the intra prediction mode of the current block.

Alternatively, when the intra prediction mode for the current block is not included among the candidate intra prediction modes in the MPM list (that is, when the MPM flag information indicates 0), the decoding apparatus may obtain remaining mode information for indicating the intra prediction mode for the current block from among the rest of intra prediction modes except for the candidate intra prediction modes in the MPM list. In addition, the intra prediction mode indicated by the remaining mode information may be derived as the intra prediction mode for the current block.

The decoding apparatus may generate prediction samples for the current block based on the intra prediction mode (S1340).

In an embodiment, the decoding apparatus may derive at least one neighbouring reference sample from among neighbouring reference samples of the current block based on the intra prediction mode derived as described above, and may generate prediction samples based on the neighbouring reference sample. Here, the neighbouring reference samples may include an upper-left corner neighbouring sample, upper neighbouring samples and left neighbouring samples of the current block. For example, when a size of the current block is W×H, and an x component of a top-left sample position of the current block is xN and a y component thereof is yN, then the left neighbouring samples may be p[xN−1][yN] to p[xN−1][2H+yN−1], the upper-left corner neighbouring sample may be p[xN−1][yN−1], and the upper neighbouring samples may be p[xN][yN−1] to p[2 W+xN−1][yN−1].

The decoding apparatus may generate a reconstructed picture for the current block based on the prediction samples (S1350).

In an embodiment, the decoding apparatus may use prediction samples directly as reconstruction samples according to prediction mode, or may generate reconstruction samples by adding residual samples to the prediction samples.

If there is a residual sample for the current block, the decoding apparatus may receive information on residual for the current block. The information on the residual may include transform coefficients of the residual samples. The decoding apparatus may derive the residual samples (or residual sample array) for the current block based on the residual information. The decoding apparatus may generate reconstructed samples based on the prediction samples and the residual samples, and may derive a reconstructed block or a reconstructed picture based on the reconstructed samples. Thereafter, as described above, the decoding apparatus may apply an in-loop filtering process such as deblocking filtering and/or an SAO process to the reconstructed picture in order to improve subjective/objective video quality, as needed.

In the above-described embodiments, the methods are explained based on the flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (ex. information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 14:
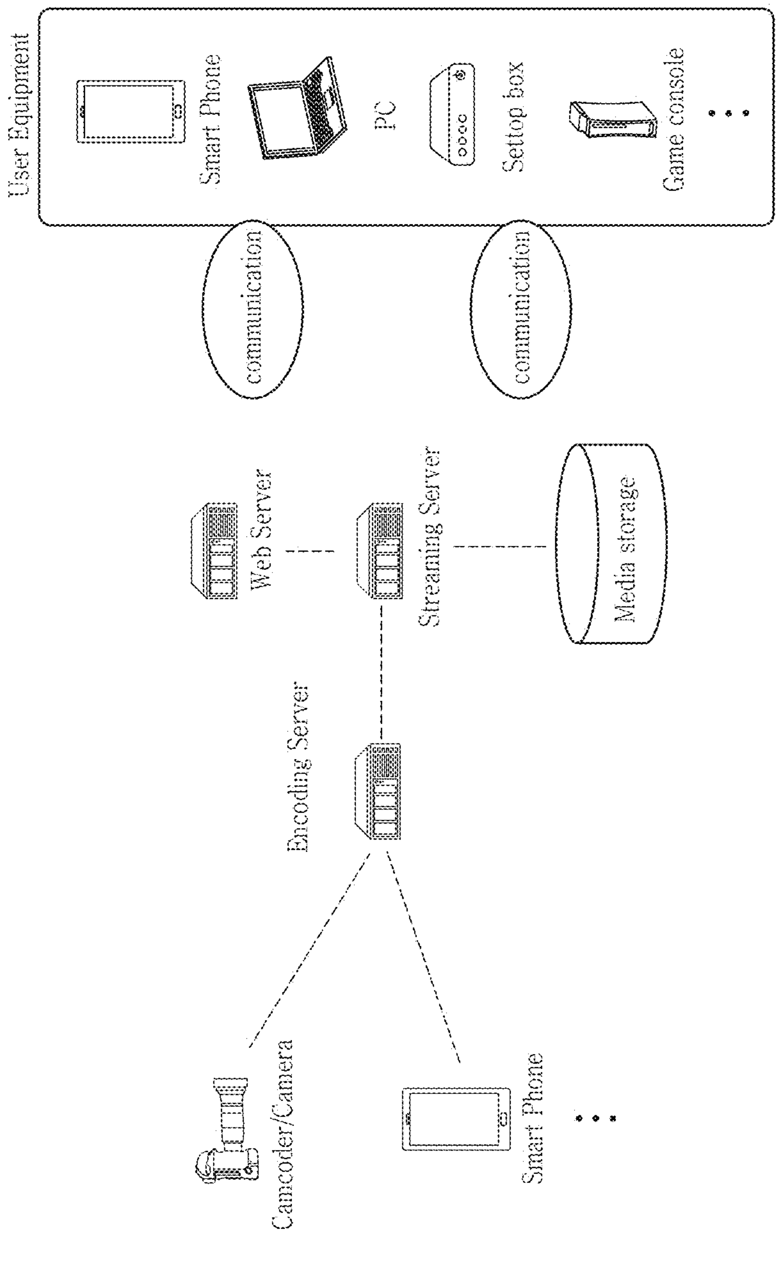
FIG. 14 shows an example of a content streaming system to which embodiments disclosed in this document may be applied.

FIG. 14 illustrates an example of a content streaming system to which embodiments disclosed in this document may be applied.

Referring to FIG. 14, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

What is claimed is:

1. A decoding apparatus for image decoding, the decoding apparatus comprising:

a memory; and at least one processor connected to the memory, the at least one processor configured to:

derive a left mode which is a candidate intra prediction mode for a left neighbouring block of a current block;

derive an upper mode which is a candidate intra prediction mode for an upper neighbouring block of the current block;

construct a Most Probable Mode (MPM) list based on the left mode and the upper mode;

derive an intra prediction mode for the current block based on the MPM list;

generate prediction samples for the current block based on the intra prediction mode; and generate a reconstructed picture for the current block based on the prediction samples, wherein based on a case where the left mode and the upper mode are not the same and the left mode and the upper mode are a planar mode or a DC mode, respectively, the left mode or the upper mode, which is the DC mode, is derived as one of candidate intra prediction modes in the MPM list, and a vertical intra prediction mode, a horizontal intra prediction mode, an intra prediction mode having a mode number of (a mode number of the vertical intra prediction mode −4), and an intra prediction mode having a mode number of (the mode number of the vertical intra prediction mode +4) are further derived as the candidate intra prediction modes in the MPM list, wherein the candidate intra prediction modes in the MPM list are represented by index values, and wherein the DC mode is related to a first index value in the MPM list, the vertical intra prediction mode is related to a second index value in the MPM list, the horizontal intra prediction mode is related to a third index value in the MPM list, the intra prediction mode having the mode number of (the mode number of the vertical intra prediction mode −4) is related to a fourth index value in the MPM list, and the intra prediction mode having the mode number of (the mode number of the vertical intra prediction mode +4) is related to a fifth index value in the MPM list.

2. An encoding apparatus for image encoding, the encoding apparatus comprising:

a memory; and at least one processor connected to the memory, the at least one processor configured to:

derive a left mode which is a candidate intra prediction mode for a left neighbouring block of a current block;

derive an upper mode which is a candidate intra prediction mode for an upper neighbouring block of the current block;

construct a Most Probable Mode (MPM) list based on the left mode and the upper mode;

derive an intra prediction mode of the current block based on the MPM list;

generate intra prediction mode information related to indicating the intra prediction mode of the current block; and encode image information including the intra prediction mode information, wherein based on a case where the left mode and the upper mode are not the same and the left mode and the upper mode are a planar mode and a DC mode, respectively, the left mode or the upper mode, which is the DC mode, is derived as one of candidate intra prediction modes in the MPM list, and a vertical intra prediction mode, a horizontal intra prediction mode, an intra prediction mode having a mode number of (a mode number of the vertical intra prediction mode −4), and an intra prediction mode having a mode number of (the mode number of the vertical intra prediction mode +4) are further derived as the candidate intra prediction modes in the MPM list, wherein the candidate intra prediction modes in the MPM list are represented by index values, and wherein the DC mode is related to a first index value in the MPM list, the vertical intra prediction mode is related to a second index value in the MPM list, the horizontal intra prediction mode is related to a third index value in the MPM list, the intra prediction mode having the mode number of (the mode number of the vertical intra prediction mode −4) is related to a fourth index value in the MPM list, and the intra prediction mode having the mode number of (the mode number of the vertical intra prediction mode +4) is related to a fifth index value in the MPM list.

3. An apparatus for transmitting data for an image, the apparatus comprising:

at least one processor configured to obtain a bitstream for the image, wherein the bitstream is generated based on deriving a left mode which is a candidate intra prediction mode for a left neighbouring block of a current block, deriving an upper mode which is a candidate intra prediction mode for an upper neighbouring block of the current block, constructing a Most Probable Mode (MPM) list based on the left mode and the upper mode, deriving an intra prediction mode of the current block based on the MPM list, generating intra prediction mode information related to indicating the intra prediction mode of the current block, and encoding image information including the intra prediction mode information; and a transmitter configured to transmit the data comprising the bitstream, wherein based on a case where the left mode and the upper mode are not the same and the left mode and the upper mode are a planar mode and a DC mode, respectively, the left mode or the upper mode, which is the DC mode, is derived as one of candidate intra prediction modes in the MPM list, and a vertical intra prediction mode, a horizontal intra prediction mode, an intra prediction mode having a mode number of (a mode number of the vertical intra prediction mode −4), and an intra prediction mode having a mode number of (the mode number of the vertical intra prediction mode +4) are further derived as the candidate intra prediction modes in the MPM list, wherein the candidate intra prediction modes in the MPM list are represented by index values, and wherein the DC mode is related to a first index value in the MPM list, the vertical intra prediction mode is related to a second index value in the MPM list, the horizontal intra prediction mode is related to a third index value in the MPM list, the intra prediction mode having the mode number of (the mode number of the vertical intra prediction mode −4) is related to a fourth index value in the MPM list, and the intra prediction mode having the mode number of (the mode number of the vertical intra prediction mode +4) is related to a fifth index value in the MPM list.

4. The decoding apparatus of claim 1, wherein it is confirmed whether or not the planar mode is derived as a candidate intra prediction mode of the current block preferentially over the DC mode, the vertical intra prediction mode, the horizontal intra prediction mode, the intra prediction mode having a mode number of (mode number of the vertical intra prediction mode −4), and the intra prediction mode having a mode number of (mode number of the vertical intra prediction mode +4).

5. The decoding apparatus of claim 1, wherein it is confirmed whether or not the planar mode is derived as a candidate intra prediction mode of the current block preferentially over the candidate intra prediction modes in the MPM list, based on whether or not 0th reference sample line for intra prediction is used for the current block.

6. The decoding apparatus of claim 5, wherein the 0th reference sample line includes a left reference sample line located first closest to a left boundary of the current block, and an upper reference sample line located first closest to an upper boundary of the current block.

7. The decoding apparatus of claim 1, wherein the at least one processor configured to construct the MPM list includes the at least one processor configured to derive the left mode and the upper mode as the candidate intra prediction modes in the MPM list based on a case that the left mode and the upper mode are not the same and one of the left mode and the upper mode is a planar mode or a DC mode, wherein a candidate intra prediction mode having a smaller mode number among the left mode and the upper mode is represented by a first index value in the MPM list, and wherein a candidate intra prediction mode having a greater mode number among the left mode and the upper mode is represented by a second index value in the MPM list.

8. The decoding apparatus of claim 7, wherein when one of the left mode and the upper mode is a planar mode, a DC mode is further derived as the candidate intra prediction modes in the MPM list, and the DC mode is represented by a third index value in the MPM list, or wherein when one of the left mode and the upper mode is a DC mode, a planar mode is further derived as the candidate intra prediction modes in the MPM list, and the planar mode is represented by a third index value in the MPM list.

9. The decoding apparatus of claim 1, wherein the at least one processor configured to derive the left mode includes the at least one processor configured to: derive an intra prediction mode of the left neighboring block as the left mode when the left neighboring block is available and intra prediction is applied to the left neighboring block; and derive a planar mode as the left mode when the left neighboring block is not available or the intra prediction is not applied to the left neighboring block.

10. The decoding apparatus of claim 1, wherein the at least one processor configured to derive the upper mode includes: derive an intra prediction mode of the upper neighboring block as the upper mode when the upper neighboring block is available, intra prediction is applied to the upper neighboring block, and the upper neighboring block is included in a current CTU; and derive a planar mode as the upper mode when the upper neighboring block is not available, the intra prediction is not applied to the upper neighboring block, or the upper neighboring block is not included in the current CTU.

11. The decoding apparatus of claim 1, wherein when the left mode is the DC mode and the upper mode is the planar mode, the left mode is derived as one of the candidate intra prediction modes in the MPM list, or wherein when the left mode is the planar mode and the upper mode is the DC mode, the upper mode is derived as one of the candidate intra prediction modes of the MPM list.

12. The decoding apparatus of claim 1, wherein when a size of the current block is W×H, an x component of a top-left sample position of the current block is xN and a y component of the top-left sample position of the current block is yN, the left neighbouring block is a block including a sample at coordinates (xN−1, yN+H−1), and the upper neighbouring block is a block including a sample at coordinates (xN+W−1, yN−1).

13. The encoding apparatus of claim 2, wherein it is confirmed whether or not the planar mode is derived as a candidate intra prediction mode of the current block preferentially over the DC mode, the vertical intra prediction mode, the horizontal intra prediction mode, the intra prediction mode having a mode number of (mode number of the vertical intra prediction mode −4), and the intra prediction mode having a mode number of (mode number of the vertical intra prediction mode +4).

14. The encoding apparatus of claim 2, wherein it is confirmed whether or not the planar mode is derived as a candidate intra prediction mode of the current block preferentially over the candidate intra prediction modes in the MPM list, based on whether or not 0th reference sample line for intra prediction is used for the current block.

15. The encoding apparatus of claim 14, wherein the 0th reference sample line includes a left reference sample line located first closest to a left boundary of the current block, and an upper reference sample line located first closest to an upper boundary of the current block.

16. The apparatus of claim 3, wherein it is confirmed during generation of the bitstream whether or not the planar mode is derived as a candidate intra prediction mode of the current block preferentially over the DC mode, the vertical intra prediction mode, the horizontal intra prediction mode, the intra prediction mode having a mode number of (mode number of the vertical intra prediction mode −4), and the intra prediction mode having a mode number of (mode number of the vertical intra prediction mode +4).

17. The apparatus of claim 3, wherein it is confirmed during generation of the bitstream whether or not the planar mode is derived as a candidate intra prediction mode of the current block preferentially over the candidate intra prediction modes in the MPM list, based on whether or not 0th reference sample line for intra prediction is used for the current block.

18. The apparatus of claim 17, wherein the 0th reference sample line includes a left reference sample line located first closest to a left boundary of the current block, and an upper reference sample line located first closest to an upper boundary of the current block.

* * * * *